US008988404B2

(12) United States Patent
Park et al.

(10) Patent No.: US 8,988,404 B2
(45) Date of Patent: Mar. 24, 2015

(54) DISPLAY DEVICE AND METHOD OF COMPENSATING FOR DATA CHARGE DEVIATION THEREOF

(71) Applicant: LG Display Co., Ltd., Seoul (KR)

(72) Inventors: Yonghwa Park, Paju-si (KR); Daeseok Oh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 100 days.

(21) Appl. No.: 13/954,543

(22) Filed: Jul. 30, 2013

(65) Prior Publication Data

US 2014/0132576 A1 May 15, 2014

(30) Foreign Application Priority Data

Nov. 13, 2012 (KR) ........................ 10-2012-0128033

(51) Int. Cl.
*G06F 3/038* (2013.01)
*G09G 3/20* (2006.01)
*G09G 5/393* (2006.01)

(52) U.S. Cl.
CPC .................. *G09G 3/20* (2013.01); *G09G 5/393* (2013.01); *G09G 2370/08* (2013.01)
USPC ............ 345/204; 345/691; 345/208; 345/213

(58) Field of Classification Search
None
See application file for complete search history.

(56) References Cited

U.S. PATENT DOCUMENTS

2003/0034948 A1* 2/2003 Imamura ......................... 345/98
2006/0244710 A1* 11/2006 Iriguchi et al. ................ 345/100
2008/0170028 A1* 7/2008 Yoshida ........................ 345/100

* cited by examiner

*Primary Examiner* — Muhammad N Edun
(74) *Attorney, Agent, or Firm* — Fenwick & West LLP

(57) ABSTRACT

A display device includes a display panel including data lines, a source driver positioned at one side of the display panel, and a timing controller which sequentially stores digital video data in a plurality of line memories, starts to generate an output data enable signal in conformity with a first writing start timing of a last line memory of the line memories, adjusts a pulse width of the output data enable signal of each horizontal pixel line based on a previously determined charge time graph, reads out the digital video data from the line memories in synchronization with rising edges of the output data enable signal, and generates a source output enable signal having the same pulse width each time each line memory finishes reading out the data.

10 Claims, 26 Drawing Sheets

DISPLAY DEVICE AND METHOD OF COMPENSATING FOR DATA CHARGE DEVIATION THEREOF

This application claims the benefit of Korean Patent Application No. 10-2012-0128033 filed on Nov. 13, 2012, which is incorporated herein by reference for all purposes as if fully set forth herein.

BACKGROUND OF THE INVENTION

1. Field of the Invention

Embodiments of the invention relate to a display device and a method of compensating for a data charge deviation thereof.

2. Discussion of the Related Art

A display device generally includes a display panel for displaying an image and a driver for driving the display panel. The display panel includes a plurality of data lines, a plurality of gate lines, and a plurality of pixels formed at crossings of the data lines and the gate lines. Examples of the display panel include a liquid crystal display panel, an organic light emitting diode (OLED) display panel, an electrophoresis display panel, and a plasma display panel. The driver includes a source driver for driving the data lines and a gate driver for driving the gate lines.

As the size of the display device increases, a load of the data lines increases. Further, as a resolution of the display device increases, time assigned to drive the data lines is reduced. Therefore, a charge deviation phenomenon resulting from an RC delay of the data lines increases, and thus the image quality of the display device may be degraded. In particular, when parasitic capacitances of the data lines increase due to an increase in the size and the resolution of the display device, parasitic capacitances at a first position close to the source driver are rapidly charged, and parasitic capacitances at a second position farther from the source driver are slowly charged by a signal delay. In other words, it is difficult to charge the parasitic capacitances of the second position farther from the source driver to a desired level within a desired time. Hence, even if the same data voltage is applied to the first and second positions, a charge deviation between the first and second positions is generated. The charge deviation causes a luminance deviation.

SUMMARY OF THE INVENTION

Embodiments of the invention provide a display device and a method of compensating for a data charge deviation thereof capable of reducing a data charge deviation between positions of a display panel.

In one aspect, a display device comprises a display panel including a plurality of data lines, a source driver which is positioned at one side of the display panel and is connected to the data lines, and a timing controller configured to sequentially store input digital video data in a plurality of line memories, start to generate an output data enable signal in conformity with a first writing start timing of a last line memory of the plurality of line memories, adjust a pulse width of the output data enable signal of each horizontal pixel line based on a previously determined charge time graph, read out the digital video data from the line memories in synchronization with rising edges of the output data enable signal, generate a source output enable signal having the same pulse width each time each line memory finishes reading out the data, and increase a low period of the source output enable signal, in which a data output is allowed, as the horizontal pixel line is farther from the source driver.

In another aspect, a method of compensating for a data charge deviation of a display device including a display panel including a plurality of data lines and a source driver which is positioned at one side of the display panel and is connected to the data lines is provided, where the method comprises sequentially storing input digital video data in a plurality of line memories, starting to generate an output data enable signal in conformity with a first writing start timing of a last line memory of the plurality of line memories, adjusting a pulse width of the output data enable signal of each horizontal pixel line based on a previously determined charge time graph, reading out the digital video data from the line memories in synchronization with rising edges of the output data enable signal, and generating a source output enable signal having the same pulse width each time each line memory finishes reading out the data to increase a low period of the source output enable signal, in which a data output is allowed, as the horizontal pixel line is farther from the source driver.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 1 to 25.

Figure 1:
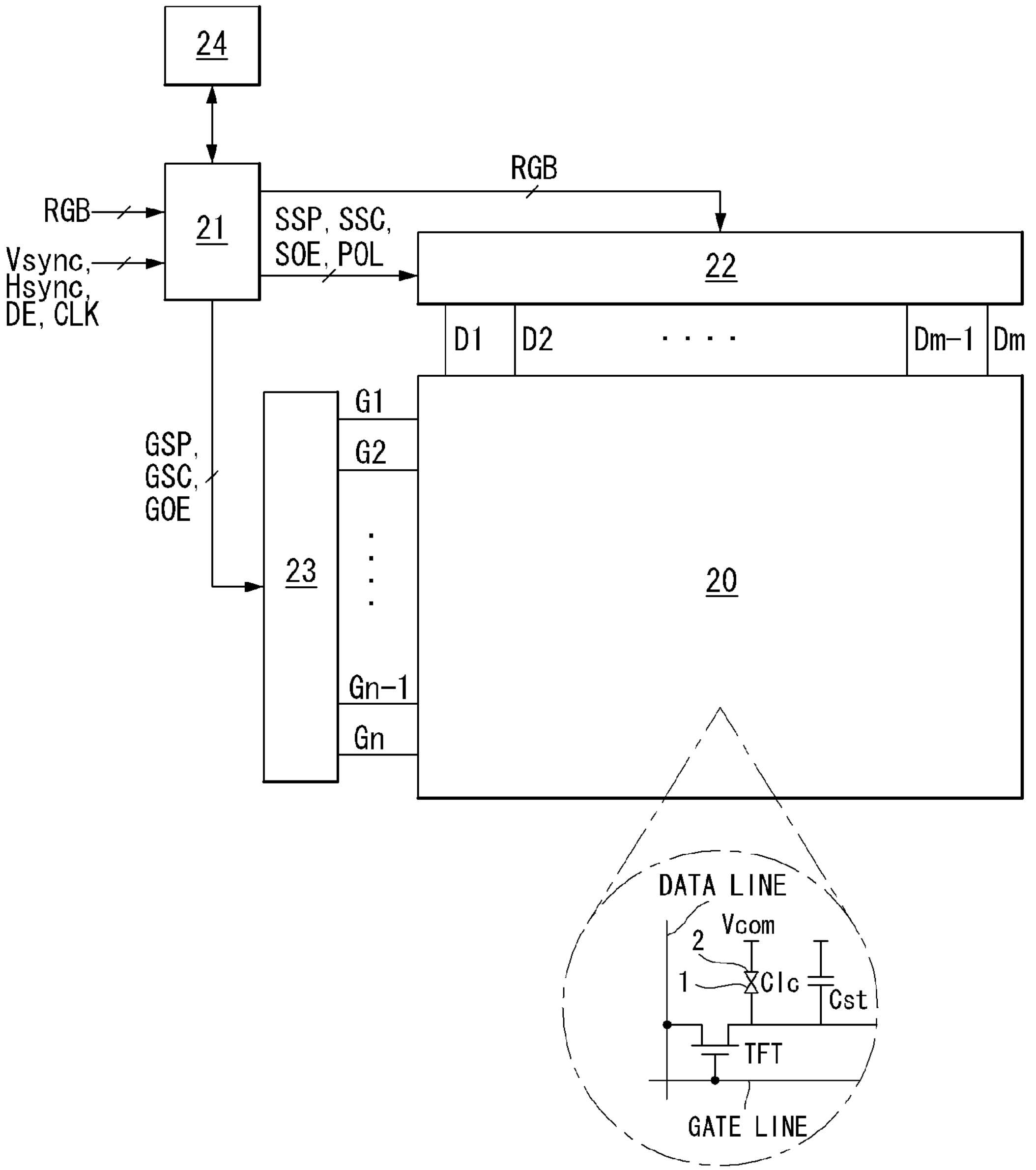
FIG. 1 illustrates a display device according to an example embodiment of the invention.
Figure 2A:
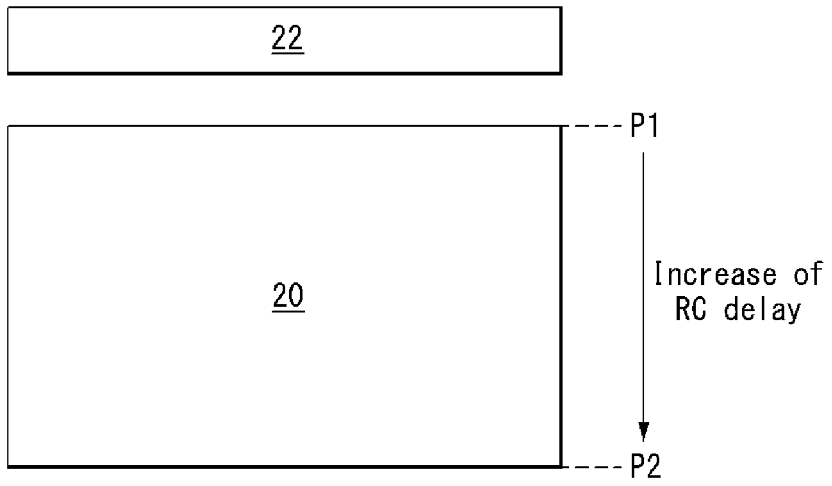
FIGS. 2A to 2C illustrate an increase direction of an RC delay depending on a position of a source driver.
Figure 2B:
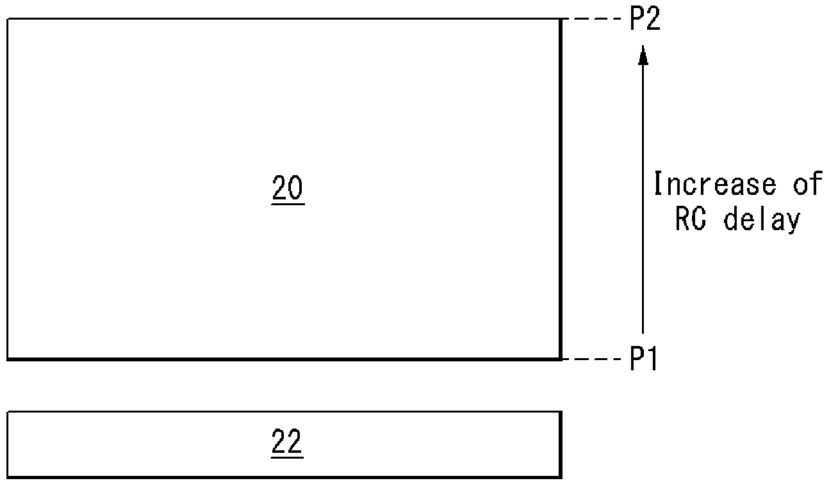
Figure 2C:
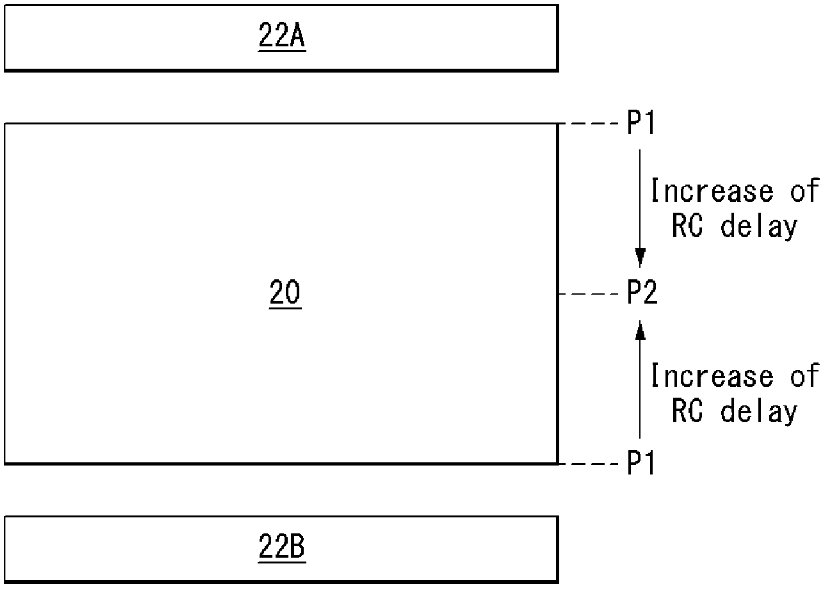
Figure 3:
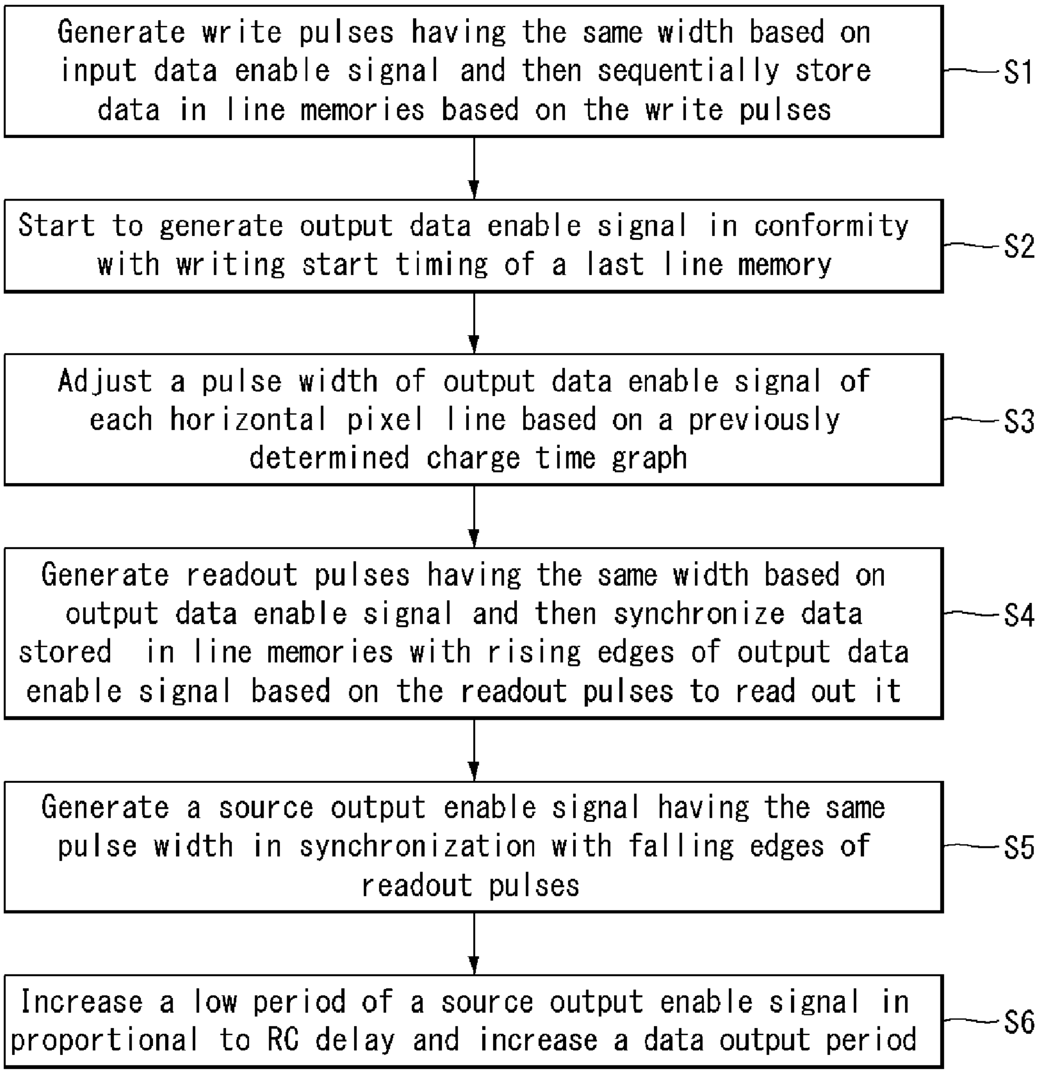
FIG. 3 schematically illustrates a process for adjusting a data output period in consideration of an RC delay according to one embodiment.

FIG. 1 illustrates a display device according to an example embodiment of the invention. FIGS. 2A to 2C illustrate an increase direction of an RC delay depending on a position of a source driver. FIG. 3 schematically illustrates a process for adjusting a data output period in consideration of an RC delay so as to reduce a data charge deviation depending on a position of a display panel.

As shown in FIG. 1, a display device according to an example embodiment of the invention includes a display panel 20, a timing controller 21, a source driver 22, a gate driver 23, and a data storage unit 24.

The display device according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

The display panel 20 includes an upper glass substrate (not shown), a lower glass substrate (not shown), and liquid crystal molecules (not shown) arranged between the upper and lower glass substrates. A plurality of liquid crystal cells Clc are arranged on the display panel 20 in a matrix form based on a crossing structure of data lines D1 to Dm and gate lines G1 to Gn, where m and n are positive integers.

A pixel array including the data lines D1 to Dm, the gate lines G1 to Gn, a plurality of thin film transistors (TFTs), a plurality of pixel electrodes 1 of the liquid crystal cells Clc respectively connected to the TFTs, storage capacitors Cst, etc. is formed on the lower glass substrate of the display panel 20. Black matrixes, color filters, common electrodes 2, etc. are formed on the upper glass substrate of the display panel 20. In a vertical electric field driving manner such as a twisted nematic (TN) mode and a vertical alignment (VA) mode, the common electrodes 2 are formed on the upper glass substrate. In a horizontal electric field driving manner such as an in-plane switching (IPS) mode and a fringe field switching (FFS) mode, the common electrodes 2 are formed on the lower glass substrate along with the pixel electrodes 1. Polarizing plates, of which optical axes are perpendicular to each other, are respectively attached to the upper and lower glass substrates of the display panel 20. Alignment layers for setting a pre-tilt angle of liquid crystals are respectively formed on the inner surfaces contacting the liquid crystals in the upper and lower glass substrates of the display panel 20.

The source driver 22 latches digital video data RGB under the control of the timing controller 21 and converts the digital video data RGB into positive and negative analog gamma compensation voltages. The source driver 22 generates positive and negative data voltages and supplies the positive and negative data voltages to the data lines D1 to Dm. The source driver 22 adjusts an output period of the data voltage of each of horizontal pixel lines under the control of the timing controller 21. The source driver 22 is driven so that an output period of the data voltage, which will be applied to a horizontal pixel line having a large RC delay, is longer than an output period of the data voltage, which will be applied to a horizontal pixel line having a small RC delay, under the control of the timing controller 21. The source driver 22 may be mounted on a tape carrier package (TCP) and may be bonded to the lower glass substrate of the display panel 20 through a tape automated bonding (TAB) process.

The gate driver 23 includes a shift register (not shown), a level shifter (not shown) for converting an output signal of the shift register into a signal having a swing width suitable for a TFT drive of the liquid crystal cells, etc. The gate driver 23 sequentially outputs scan pulses to the gate lines G1 to Gn under the control of the timing controller 21. In this instance, the gate driver 23 adjusts a width of each scan pulse in consideration of the RC delay. The gate driver 23 is driven so that a width of the scan pulse for selecting a horizontal pixel line having a large RC delay is greater than a width of the scan pulse for selecting a horizontal pixel line having a small RC delay under the control of the timing controller 21. The gate driver 23 may be mounted on the TCP and may be bonded to the lower glass substrate of the display panel 20 through the TAB process. Alternatively, the gate driver 23 may be directly formed on the lower glass substrate of the display panel 20 through a gate-in-panel (GIP) process at the same time as the pixel array.

The timing controller 21 receives timing signals, such as a vertical sync signal Vsync, a horizontal sync signal Hsync, a data enable signal DE, and a clock signal CLK, from a system board (not shown) and generates an output data enable signal and an output clock signal. The timing controller 21 controls operation timings of the source driver 22 and the gate driver 23 based on the output data enable signal and the output clock signal, so that a charge period of the data voltage may be adjusted depending on the RC delay. As shown in FIGS. 2A to 2C, the RC delay at a position P1 close to the source driver 22 is less than the RC delay at a position P2 farther from the source driver 22. As shown in FIGS. 2A and 2B, when the source driver 22 is positioned at the upper (or lower) side of the display panel 20, the RC delay of the lower (or upper) side of the display panel 20 relatively increases. As shown in FIG. 2C, when source drivers 22A and 22B are respectively positioned at the upper and lower sides of the display panel 20, the RC delay in the middle of the display panel 20 relatively increases.

The data storage unit 24 includes k line memories, where k is a positive integer equal to or greater than 2. The data storage unit 24 sequentially stores the digital video data RGB received from the system board under the control of the timing controller 21.

As shown in FIG. 3, the timing controller 21 generates write pulses having the same width based on the data enable signal DE received from the system board, and then sequentially stores the digital video data RGB received from the system board in the k line memories based on the write pulses in step S1. The timing controller 21 starts to generate the output data enable signal in conformity with a writing start timing of the last line memory of the k line memories in step S2. The timing controller 21 adjusts a pulse width of the output data enable signal of each horizontal pixel line based on a previously determined charge time graph in step S3. A charge time graph shown in FIG. 6A may be set to those shown in FIGS. 7A, 8A, . . . , 21A, and 22A depending on the model and characteristics of the display panel 20. The timing controller 21 generates readout pulses having the same width based on the output data enable signal, and then reads out the digital video data RGB stored in the k line memories in synchronization with rising edges of the output data enable signal based on the readout pulses in step S4. The timing controller 21 generates a source output enable signal SOE having the same pulse width in synchronization with falling edges of the readout pulses in step S5. The source output enable signal SOE controls an output timing of the source driver 22 and allows an output of the data voltage in its low period. The timing controller 21 increases the low period of the source output enable signal SOE in proportion to the RC delay and increases a data output period in step S6. When the timing controller 21 generates the source output enable signal SOE in consideration of the RC delay, the timing controller 21 may generate a gate output enable signal GOE corresponding to the source output enable signal SOE. The gate output enable signal GOE controls an output timing of the gate driver 23 and allows an output of the scan pulse in its low period.

Figure 4:
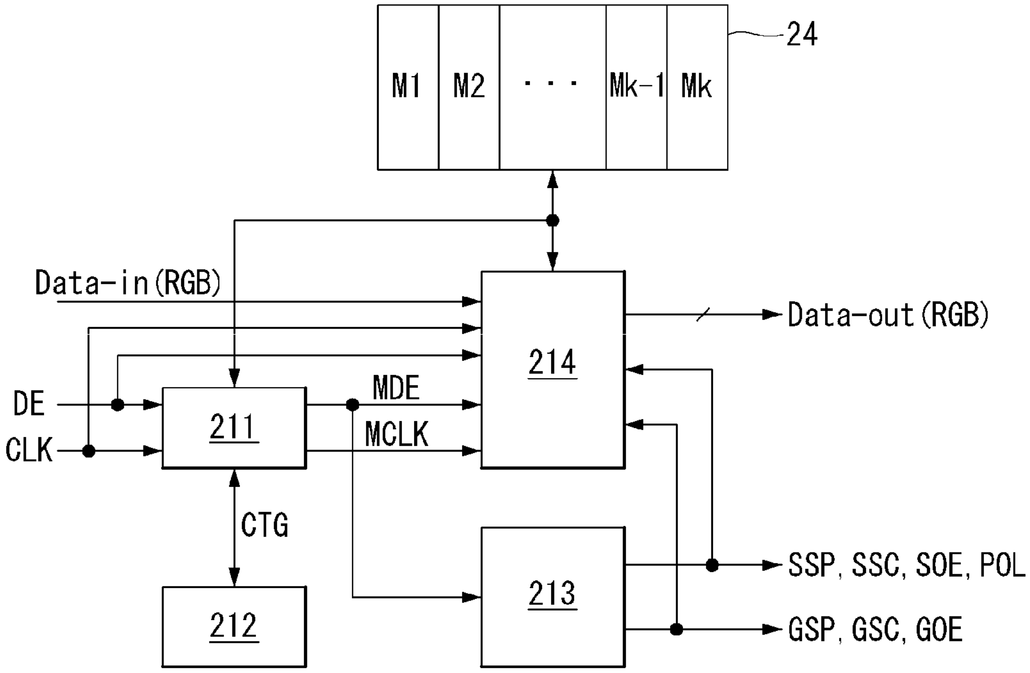
FIG. 4 illustrates a detailed configuration of a timing controller for adjusting a data output period according to one embodiment.

FIG. 4 illustrates a detailed configuration of the timing controller 21 for adjusting the data output period.

As shown in FIG. 4, the timing controller 21 includes a timing signal modulator 211, a charge time graph setting unit 212, a control signal generator 213, and a data processing unit 214.

The timing signal modulator 211 receives the data enable signal DE and the clock signal CLK from the system board and generates an output data enable signal MDE and an output clock signal MCLK. The output clock signal MCLK has a frequency which is about two times greater than the input clock signal CLK. The timing signal modulator 211 starts to generate the output data enable signal MDE in conformity with a first writing start timing of a last line memory Mk of k line memories M1 to Mk included in the data storage unit 24. The timing signal modulator 211 adjusts a pulse width of the output data enable signal MDE of each horizontal pixel line based on a charge time graph CTG previously determined by the charge time graph setting unit 212. In this instance, the timing signal modulator 211 may adjust the pulse width of the output data enable signal MDE using the output clock signal MCLK.

The control signal generator 213 generates a data timing control signal for controlling the source driver 22 and a gate timing control signal for controlling the gate driver 23 based on the output data enable signal MDE.

The data timing control signal includes a source start pulse SSP, a source sampling clock SSC, a polarity control signal POL, a source output enable signal SOE, etc. The source start pulse SSP controls a data sampling start timing of the source driver 22. The source sampling clock SSC controls a sampling timing of data in the source driver 22 based on its rising or falling edge. The source output enable signal SOE controls an output timing of the source driver 22. In particular, the source output enable signal SOE has the same pulse width in synchronization with the falling edges of the readout pulses, and a low period of the source output enable signal SOE increases in proportion to the RC delay. The polarity control signal POL controls a horizontal polarity inversion timing of the data voltage output from the source driver 22.

The gate timing control signal includes a gate start pulse GSP, a gate shift clock GSC, a gate output enable signal GOE, etc. The gate start pulse GSP is generated at the same time as a start time point of one frame period once during the one frame period and generates a first gate pulse. The gate shift clock GSC is commonly input to a plurality of stages included in a shift register and shifts the gate start pulse GSP. The gate output enable signal GOE controls an output of the gate driver 23. The gate output enable signal GOE may be generated in synchronization with the source output enable signal SOE, and thus a low period of the gate output enable signal GOE may increase in proportion to the RC delay.

The data processing unit 214 generates the write pulses having the same width based on the input data enable signal DE and then sequentially stores the input digital video data RGB in the k line memories M1 to Mk based on the write pulses. The data processing unit 214 generates the readout pulses having the same width based on the output data enable signal MDE, and then reads out the digital video data RGB stored in the k line memories M1 to Mk in synchronization with rising edges of the output data enable signal MDE based on the readout pulses. The data processing unit 214 outputs the readout data to the source driver 22. The source driver 22 outputs the data voltage in the low period of the source output enable signal SOE determined depending on the RC delay.

Figure 5A:
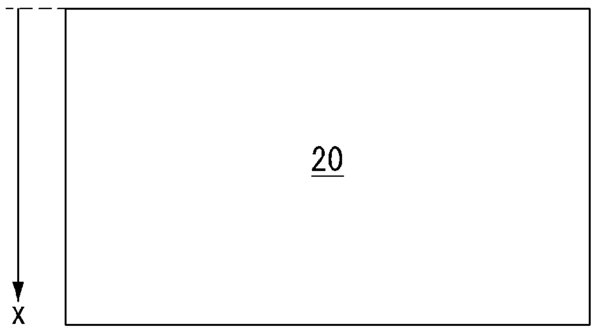
FIGS. 5A and 5B respectively illustrate an x-axis and a y-axis in a graph of a data charge time depending on a position of a display panel, according to one embodiment.
Figure 5B:
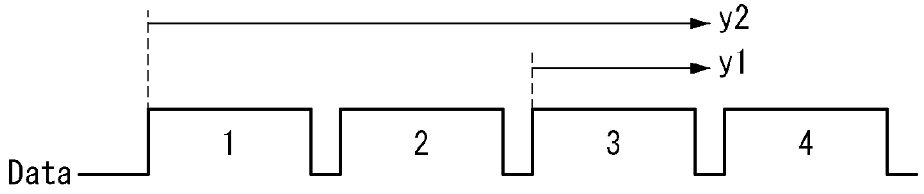
Figure 6A:
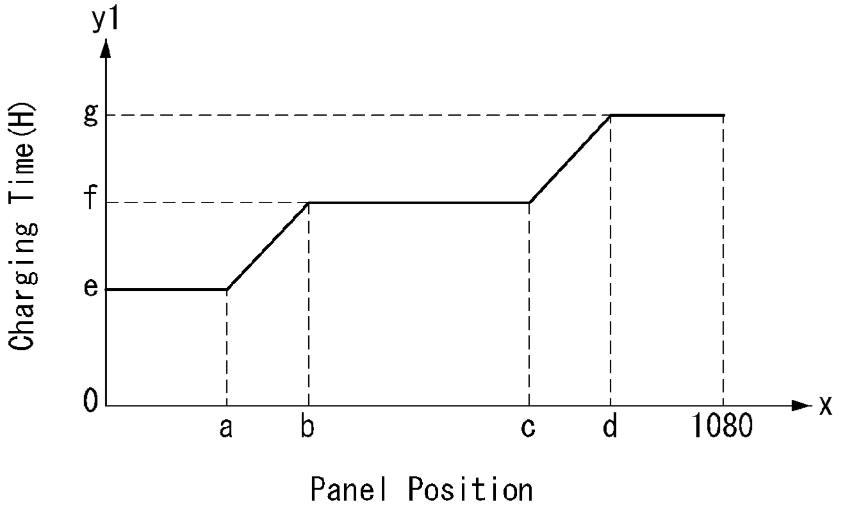
FIGS. 6A and 6B respectively illustrate a data charge time and a cumulative data charge time depending on a position of a display panel, according to one embodiment.
Figure 6B:
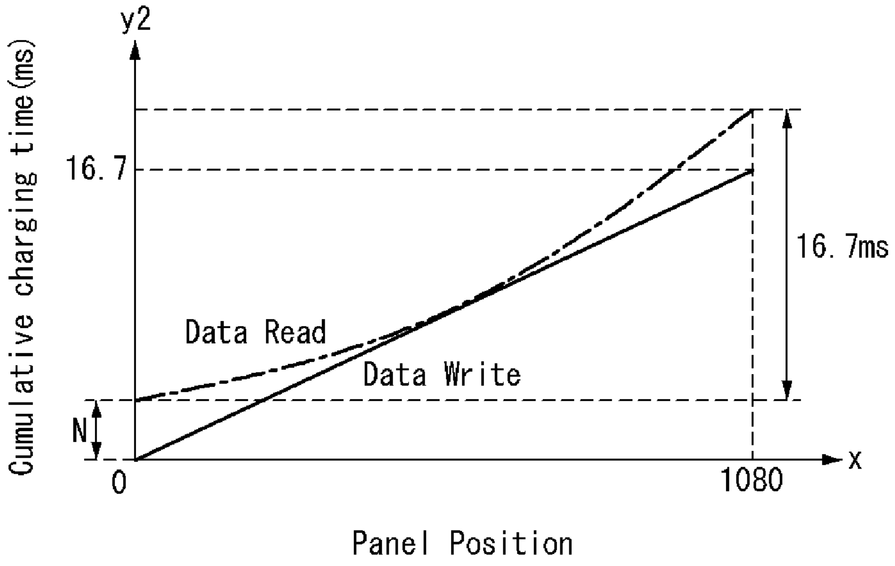

FIGS. 5A and 5B respectively illustrate an x-axis and a y-axis in a graph of a data charge time depending on a position of the display panel. FIGS. 6A and 6B respectively illustrate a data charge time and a cumulative data charge time depending on a position of the display panel.

In a graph shown in FIGS. 6A and 6B, "x" denotes a vertical position of the display panel, "y1" denotes a data charge time at each position of the display panel, and "y2" denotes a cumulative data charge time at each position of the display panel.

As shown in FIG. 6A, according to one embodiment, the charge time graph may be set such that the data charge time is kept constant at panel positions '0-a', 'b-c' and 'd-1080' and equally increases at panel positions 'a-b' and 'c-d'. First, the embodiment of the invention sets the charge time graph, so that a data write time point is always earlier than a data read time point as shown in FIG. 6B. Namely, as shown in FIG. 6B, a data write graph has to underlie a data read graph. Second, the charge time graph is set so that all data for displaying one screen are processed within one frame (for example, 16.7 ms). In FIG. 6B, 'N' is determined so that the two above-described conditions are satisfied. In FIG. 6B, 'N' indicates a time interval until data of a first horizontal line is written to the memory and then is again read out, and the number of line memories used is 'N+1'.

Figure 7A:
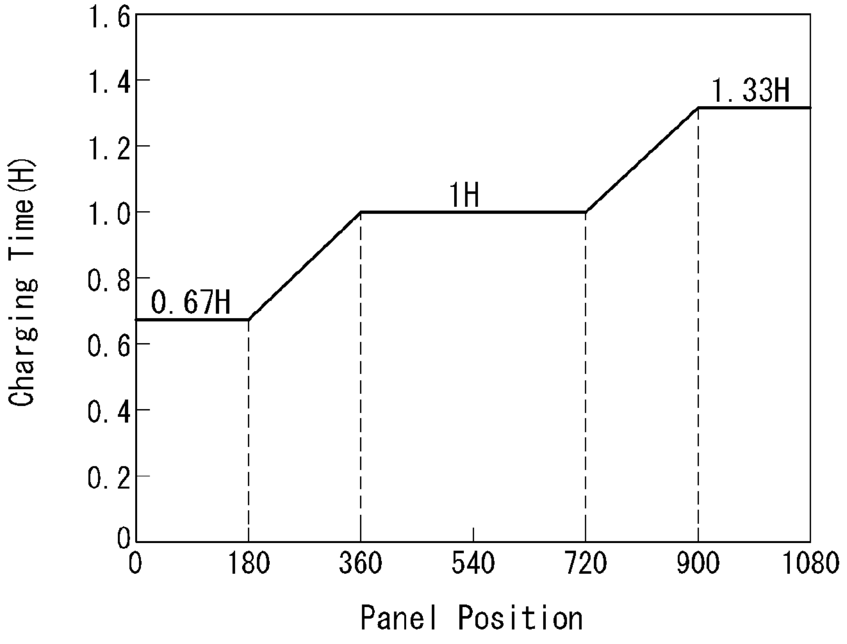
FIGS. 7A, 7B, 8A and 8B illustrate a first setting example of a charge time graph.

FIGS. 7A, 7B, 8A and 8B illustrate a first setting example of the charge time graph. In the first setting example, the panel positions 'a', 'b', 'c', and 'd' are not '0' and '1080' and have different values. The panel positions 'a', 'b', 'c', and 'd' are '180', '360', '720', and '900', respectively. Slopes at the panel positions 'a-b' and 'c-d' in FIG. 7A are different from slopes at the panel positions 'a-b' and 'c-d' in FIG. 8A.

Figure 7B:
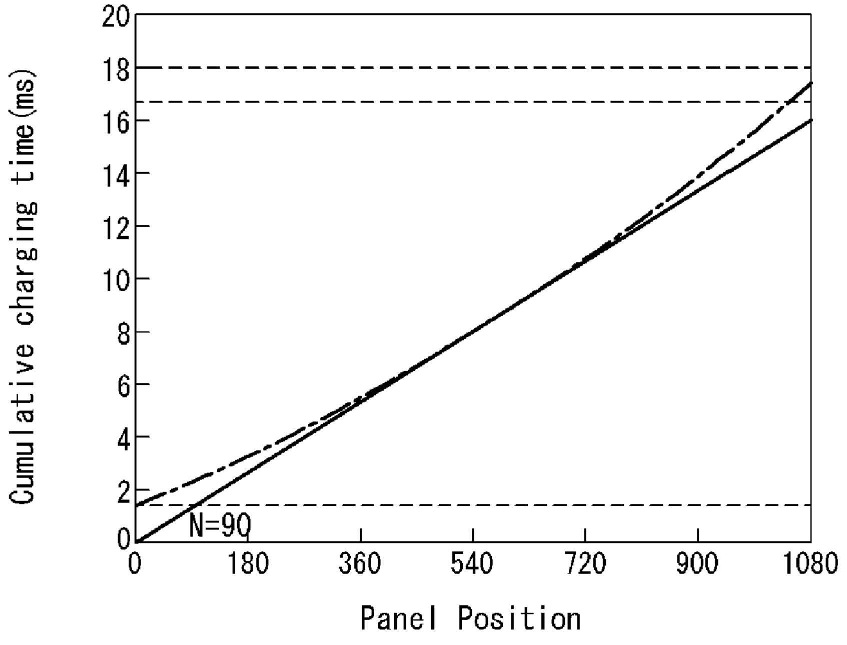

In FIGS. 7A and 7B, the slopes at the panel positions 'a-b' and 'c-d' correspond to an increase in the two output clock signals MCLK each time one horizontal period 1H increases. Further, the data charge time on the upper side (when the RC delay has a small value) may be set to 0.67H; the data charge time in the middle (when the RC delay has a middle value) may be set to 1H; and the data charge time on the lower side (when the RC delay has a large value) may be set to 1.33H. The 91 line memories are required to achieve the above settings of the data charge time.

Figure 8A:
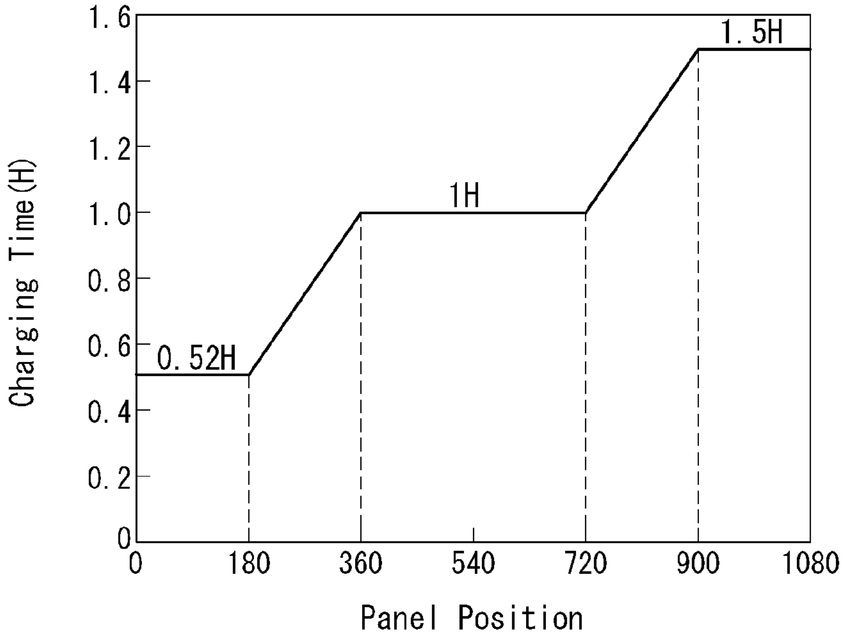
Figure 8B:
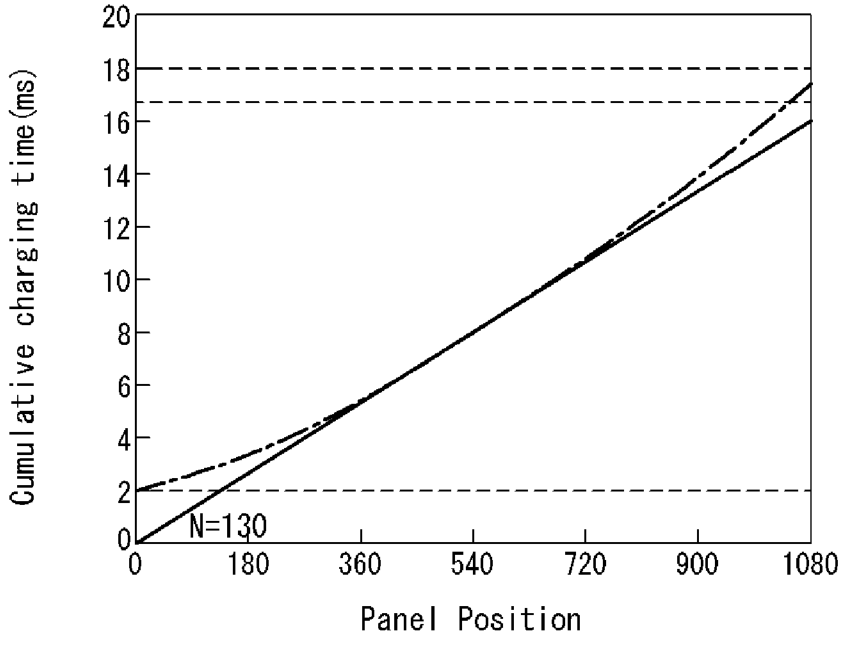

In FIGS. 8A and 8B, the slopes at the panel positions 'a-b' and 'c-d' correspond to an increase in the three output clock signals MCLK each time one horizontal period 1H increases. Further, the data charge time on the upper side may be set to 0.52H; the data charge time in the middle may be set to 1H; and the data charge time on the lower side may be set to 1.5H.

The 131 line memories are required to achieve the above settings of the data charge time.

Figure 9A:
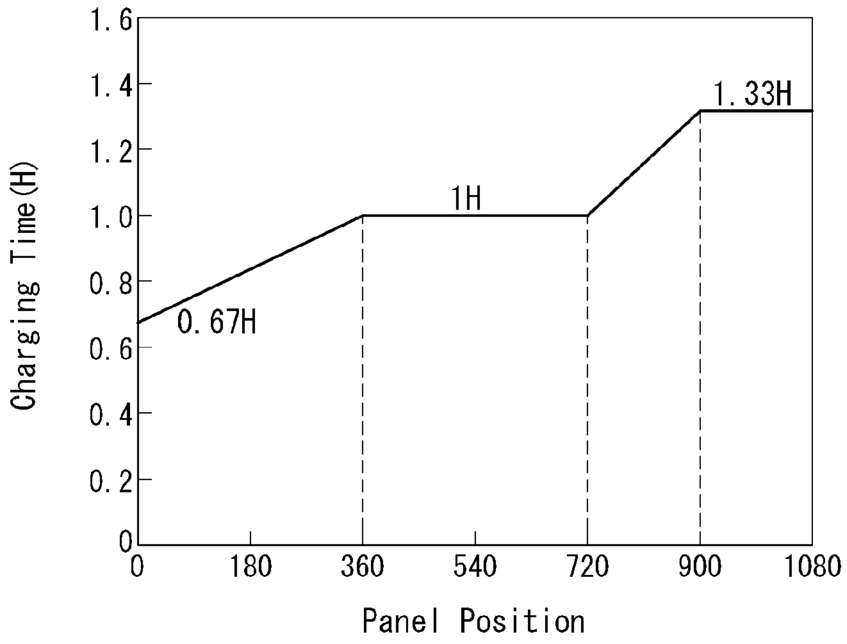
FIGS. 9A, 9B, 10A and 10B illustrate a second setting example of a charge time graph.

FIGS. 9A, 9B, 10A and 10B illustrate a second setting example of the charge time graph. The second setting example indicates that the panel position 'a' in the first setting example is zero. The panel positions 'b', 'c' and 'd' are '360', '720' and '900' in the same manner as the first setting example, respectively. Slopes at the panel positions 'a-b' and 'c-d' in FIG. 9A are different from slopes at the panel positions 'a-b' and 'c-d' in FIG. 10A.

Figure 9B:
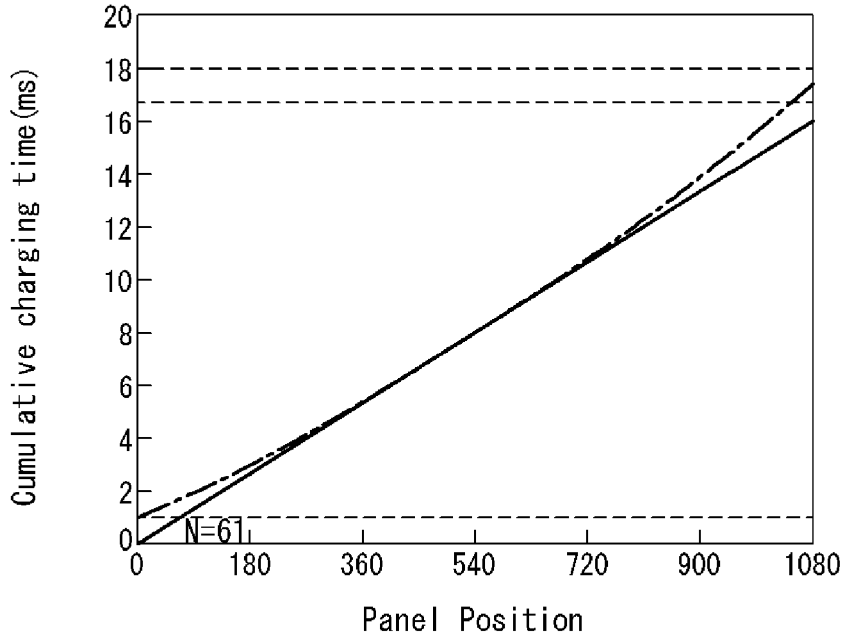

In FIGS. 9A and 9B, the slope at the panel position 'a-b' corresponds to an increase in the one output clock signal MCLK each time one horizontal period 1H increases, and the slope at the panel position 'c-d' corresponds to an increase in the two output clock signals MCLK each time one horizontal period 1H increases. Further, the data charge time on the upper side may be set to 0.67H; the data charge time in the middle may be set to 1H; and the data charge time on the lower side may be set to 1.33H. The 62 line memories are required to achieve the above settings of the data charge time.

Figure 10A:
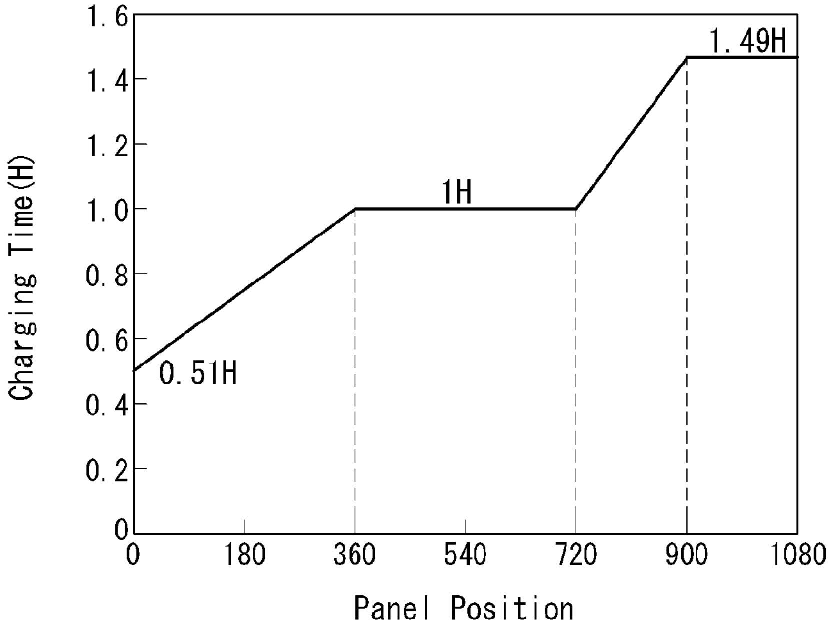
Figure 10B:
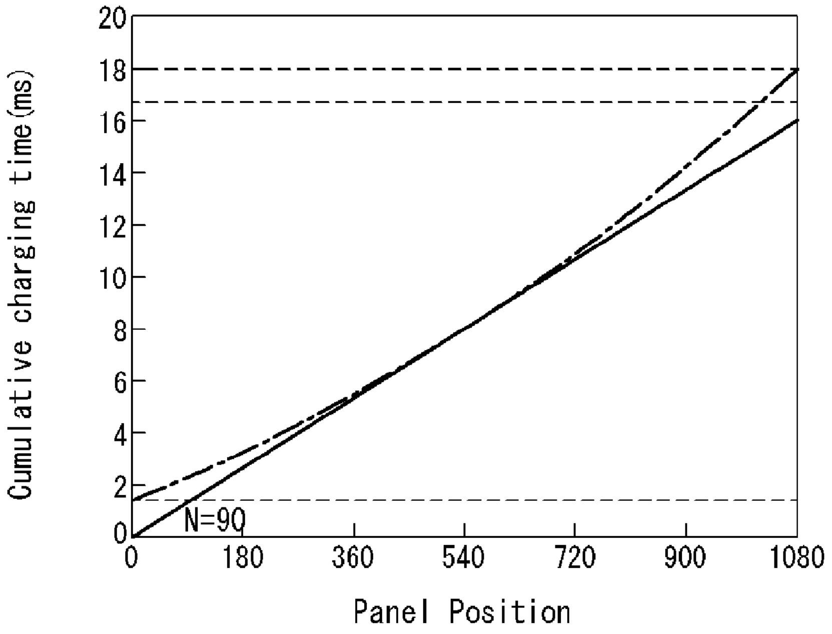

In FIGS. 10A and 10B, the slope at the panel position 'a-b' corresponds to an increase in the three output clock signals MCLK each time two horizontal periods 2H increase, and the slope at the panel position 'c-d' corresponds to an increase in the three output clock signals MCLK each time one horizontal period 1H increases. Further, the data charge time on the upper side may be set to 0.51H; the data charge time in the middle may be set to 1H; and the data charge time on the lower side may be set to 1.49H. The 91 line memories are required to achieve the above settings of the data charge time.

Figure 11A:
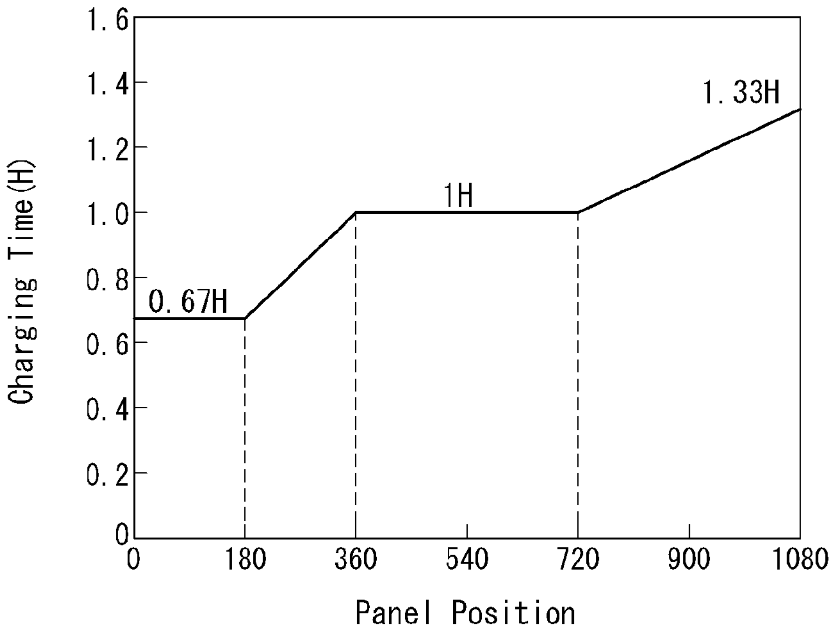
FIGS. 11A, 11B, 12A and 12B illustrate a third setting example of a charge time graph.

FIGS. 11A, 11B, 12A and 12B illustrate a third setting example of the charge time graph. The third setting example indicates that the panel position 'd' in the first setting example is '1080'. The panel positions 'a', 'b' and 'c' are '180', '360' and '720' in the same manner as the first setting example, respectively. Slopes at the panel positions 'a-b' and 'c-d' in FIG. 11A are different from slopes at the panel positions 'a-b' and 'c-d' in FIG. 12A.

Figure 11B:
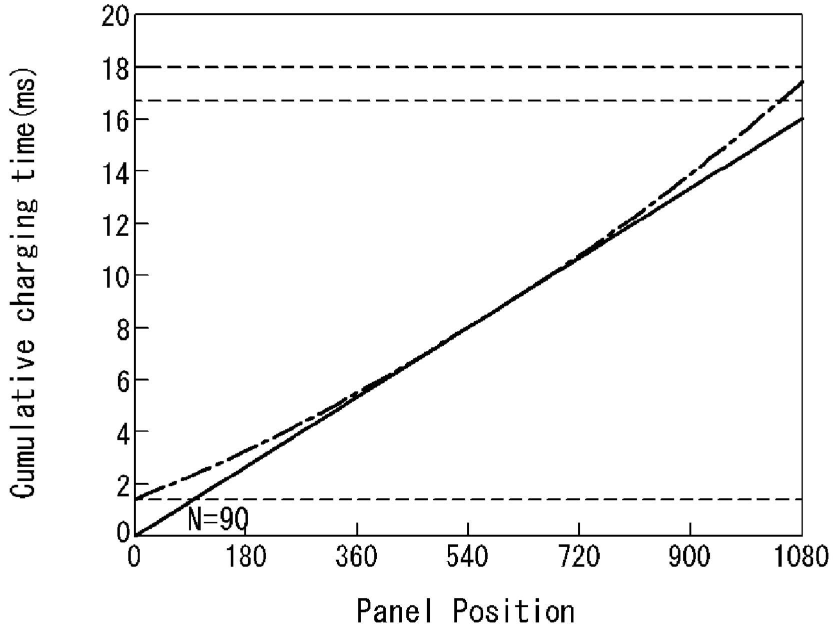

In FIGS. 11A and 11B, the slope at the panel position 'a-b' corresponds to an increase in the two output clock signals MCLK each time one horizontal period 1H increases, and the slope at the panel position 'c-d' corresponds to an increase in the one output clock signal MCLK each time one horizontal period 1H increases. Further, the data charge time on the upper side may be set to 0.67H; the data charge time in the middle may be set to 1H; and the data charge time on the lower side may be set to 1.33H. The 91 line memories are required to achieve the above settings of the data charge time.

Figure 12A:
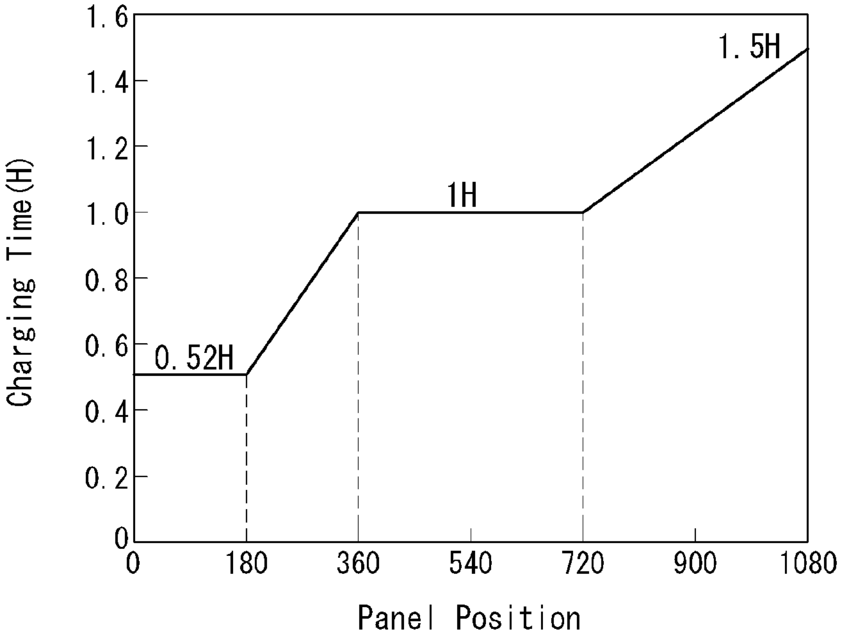
Figure 12B:
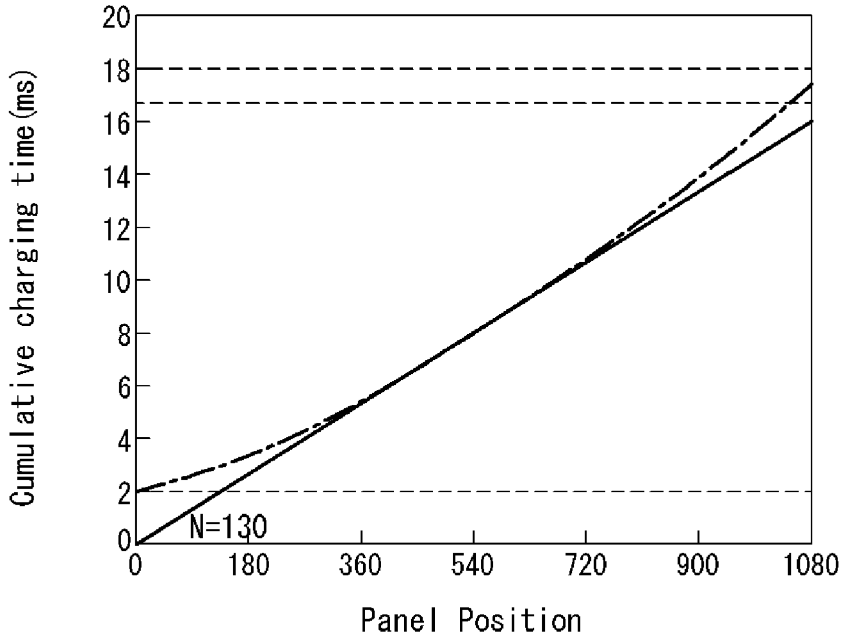

In FIGS. 12A and 12B, the slope at the panel position 'a-b' corresponds to an increase in the three output clock signals MCLK each time one horizontal period 1H increases, and the slope at the panel position 'c-d' corresponds to an increase in the three output clock signals MCLK each time two horizontal periods 2H increase. Further, the data charge time on the upper side may be set to 0.52H; the data charge time in the middle may be set to 1H; and the data charge time on the lower side may be set to 1.5H. The 131 line memories are required to achieve the above settings of the data charge time.

Figure 13A:
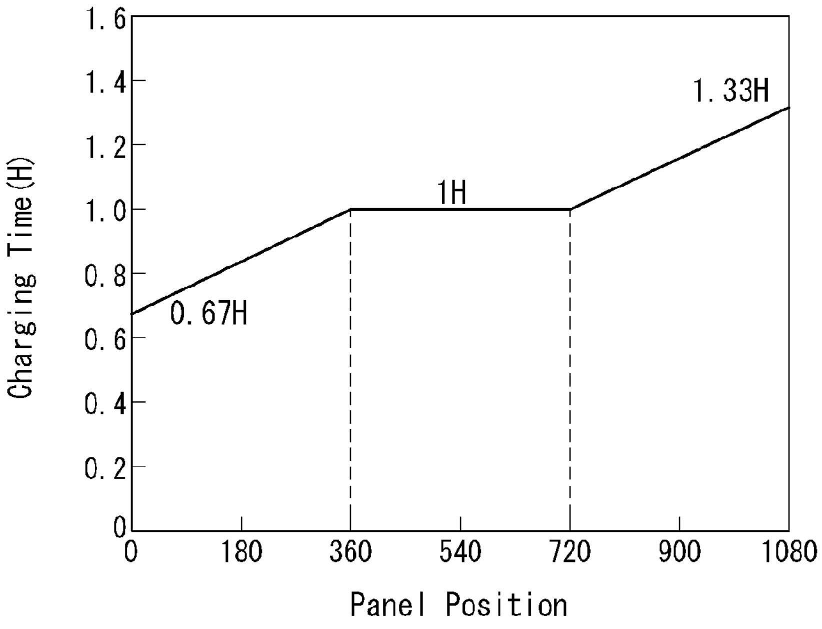
FIGS. 13A, 13B, 14A and 14B illustrate a fourth setting example of a charge time graph.
Figure 13B:
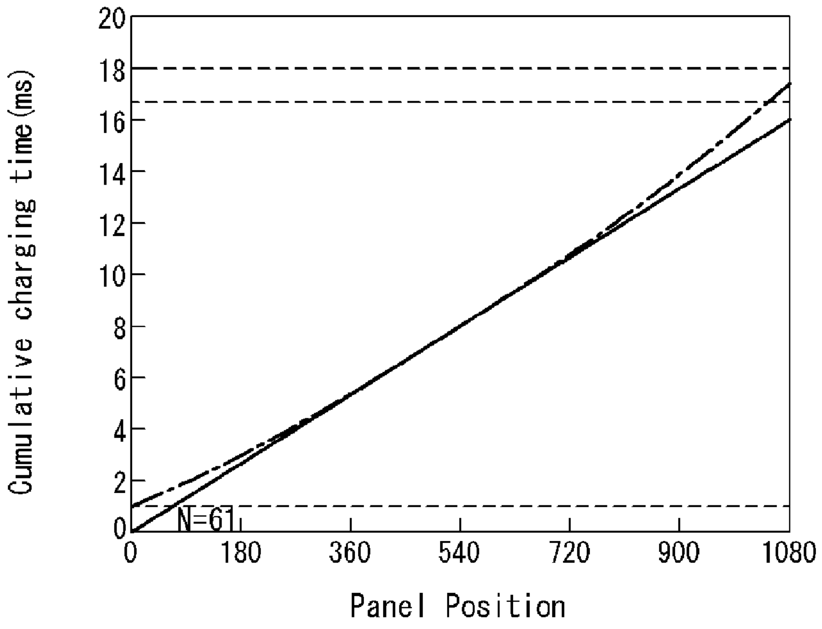
Figure 14A:
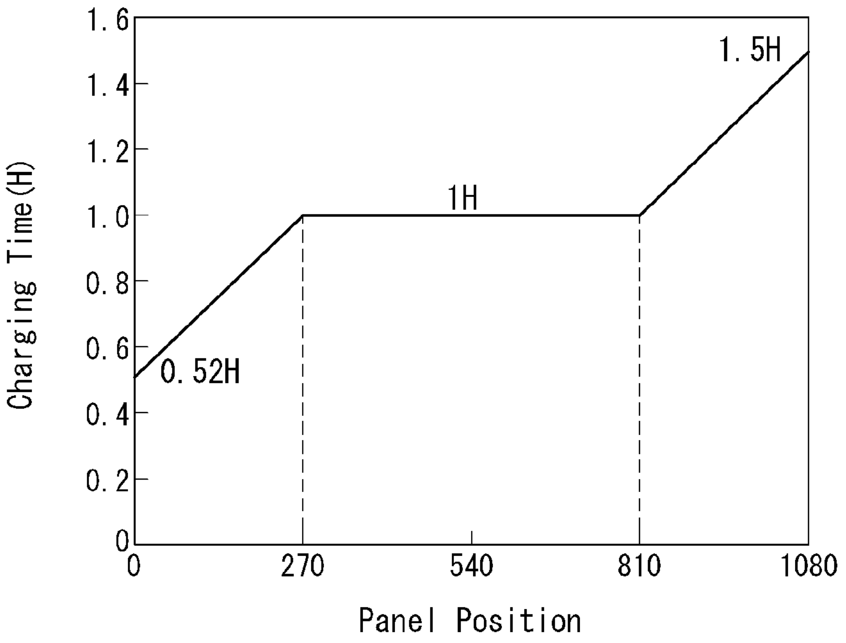
Figure 14B:
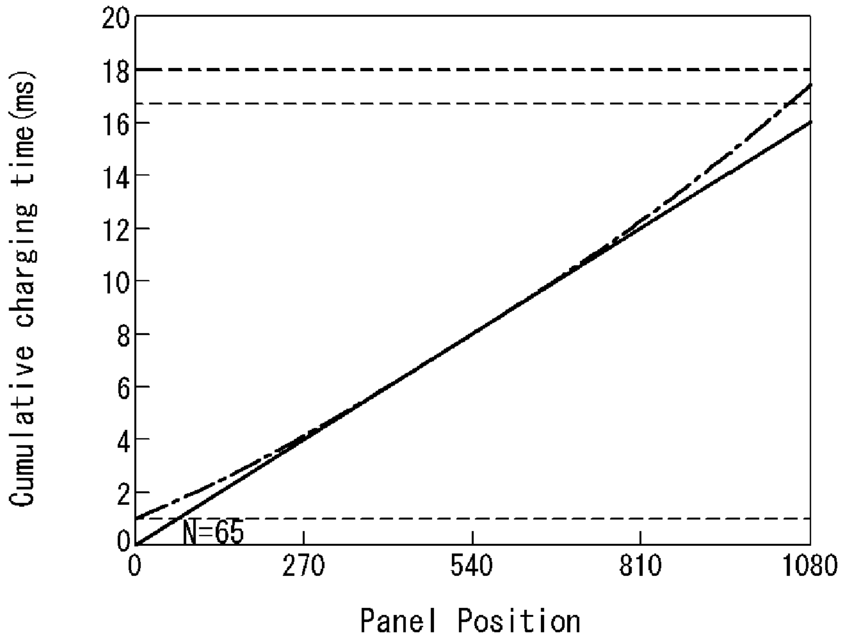

FIGS. 13A, 13B, 14A and 14B illustrate a fourth setting example of the charge time graph. The fourth setting example indicates that the panel positions 'a' and 'd' in the first setting example are '0 (zero)' and '1080', respectively. In FIGS. 13A and 13B, the panel positions 'b' and 'c' are '360' and '720' in the same manner as the first setting example, respectively. In FIGS. 14A and 14B, the panel positions 'b' and 'c' are '270' and '810' unlike the first setting example, respectively. Slopes at the panel positions 'a-b' and 'c-d' in FIG. 13A are different from slopes at the panel positions 'a-b' and 'c-d' in FIG. 14A.

In FIGS. 13A and 13B, the slopes at the panel positions 'a-b' and 'c-d' correspond to an increase in the one output clock signal MCLK each time one horizontal period 1H increases. Further, the data charge time on the upper side may be set to 0.67H; the data charge time in the middle may be set to 1H; and the data charge time on the lower side may be set to 1.33H. The 62 line memories are required to achieve the above settings of the data charge time.

In FIGS. 14A and 14B, the slopes at the panel positions 'a-b' and 'c-d' correspond to an increase in the two output clock signals MCLK each time one horizontal period 1H increases. Further, the data charge time on the upper side may be set to 0.52H; the data charge time in the middle may be set to 1H; and the data charge time on the lower side may be set to 1.5H. The 66 line memories are required to achieve the above settings of the data charge time.

Figure 15A:
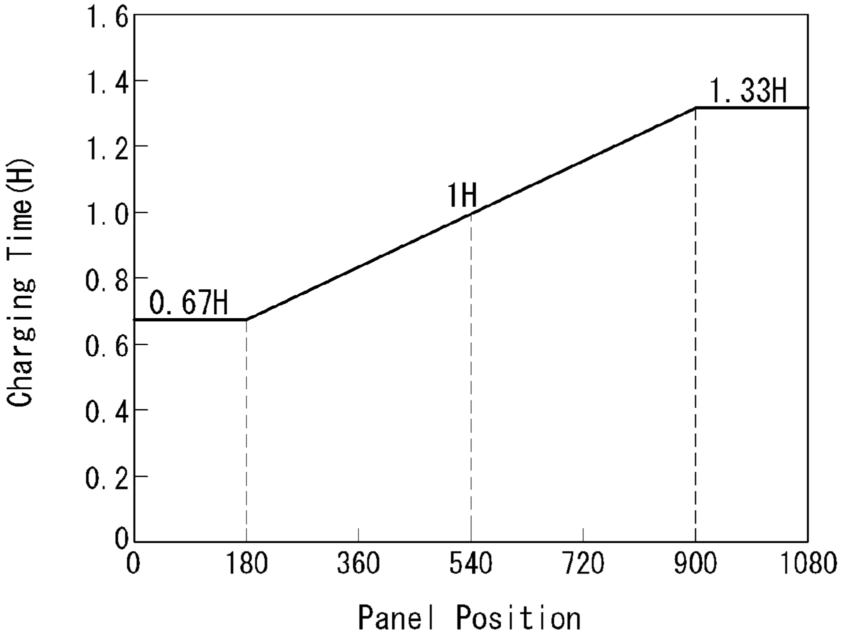
FIGS. 15A, 15B, 16A and 16B illustrate a fifth setting example of a charge time graph.
Figure 15B:
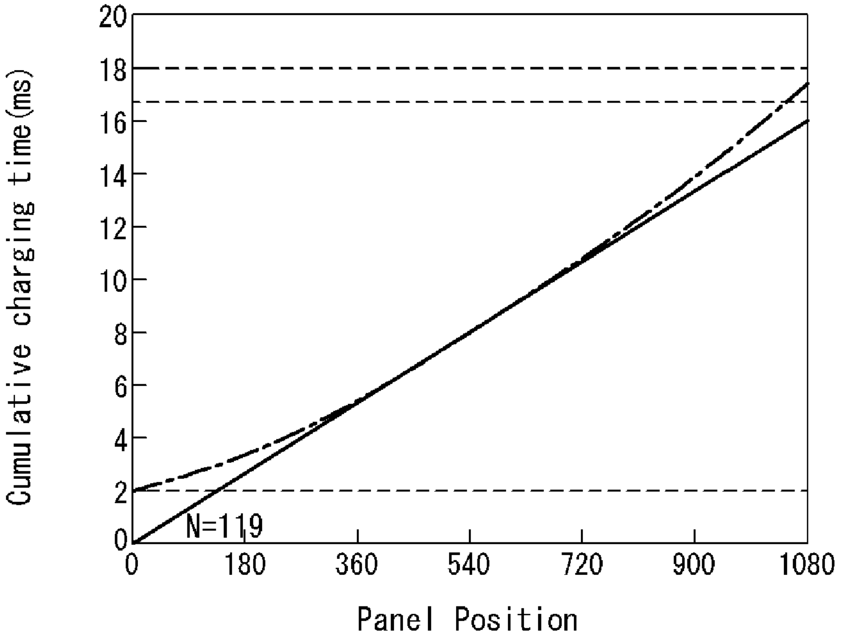
Figure 16A:
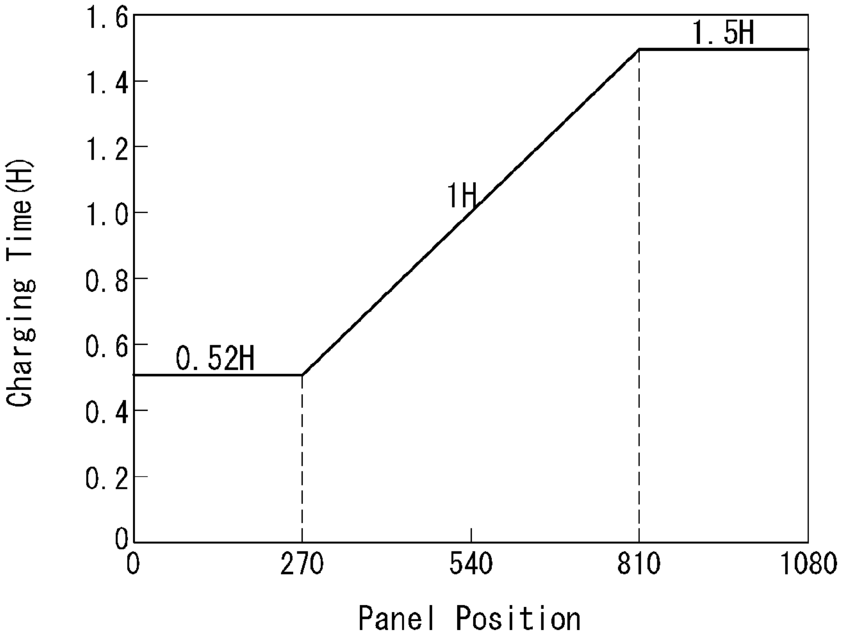
Figure 16B:
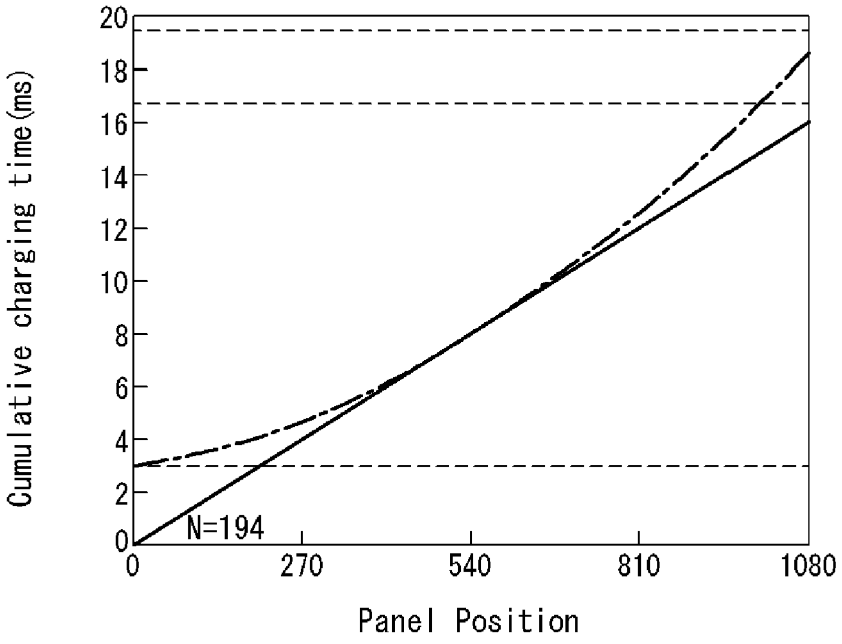

FIGS. 15A, 15B, 16A and 16B illustrate a fifth setting example of the charge time graph. In the fifth setting example, both the panel positions 'c' and 'd' are '1080'. In FIGS. 15A and 15B, the panel positions 'a' and 'b' are '180' and '900', respectively. In FIGS. 16A and 16B, the panel positions 'a' and 'b' are '270' and '810', respectively. A slope at the panel position 'a-b' in FIG. 15A is different from a slope at the panel position 'a-b' in FIG. 16A.

In FIGS. 15A and 15B, the slope at the panel position 'a-b' corresponds to an increase in the one output clock signal MCLK each time one horizontal period 1H increases. Further, the data charge time on the upper side may be set to 0.67H; the data charge time in the middle may be set to 1H; and the data charge time on the lower side may be set to 1.33H. The 120 line memories are required to achieve the above settings of the data charge time.

In FIGS. 16A and 16B, the slope at the panel position 'a-b' corresponds to an increase in the two output clock signals MCLK each time one horizontal period 1H increases. Further, the data charge time on the upper side may be set to 0.52H; the data charge time in the middle may be set to 1H; and the data charge time on the lower side may be set to 1.5H. The 195 line memories are required to achieve the above settings of the data charge time.

Figure 17A:
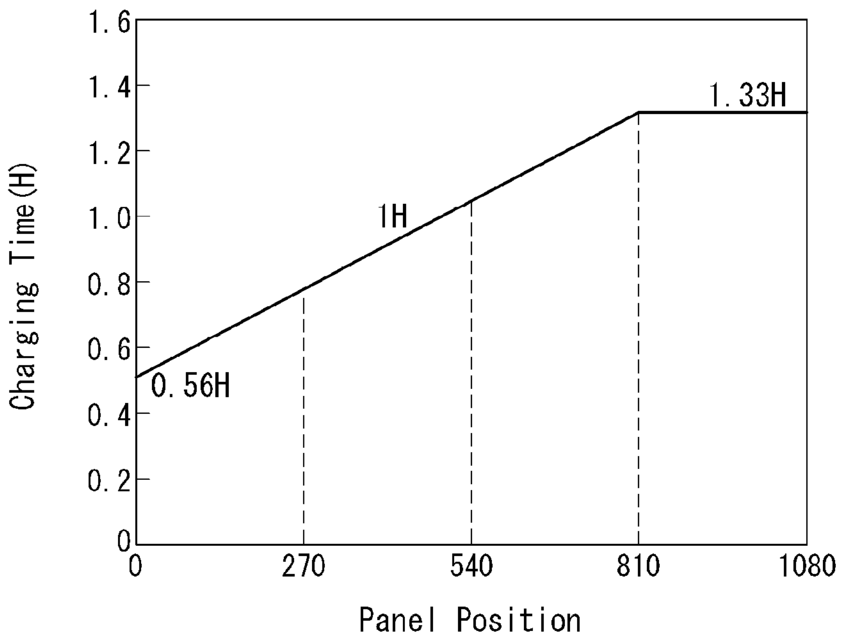
FIGS. 17A, 17B, 18A and 18B illustrate a sixth setting example of a charge time graph.
Figure 17B:
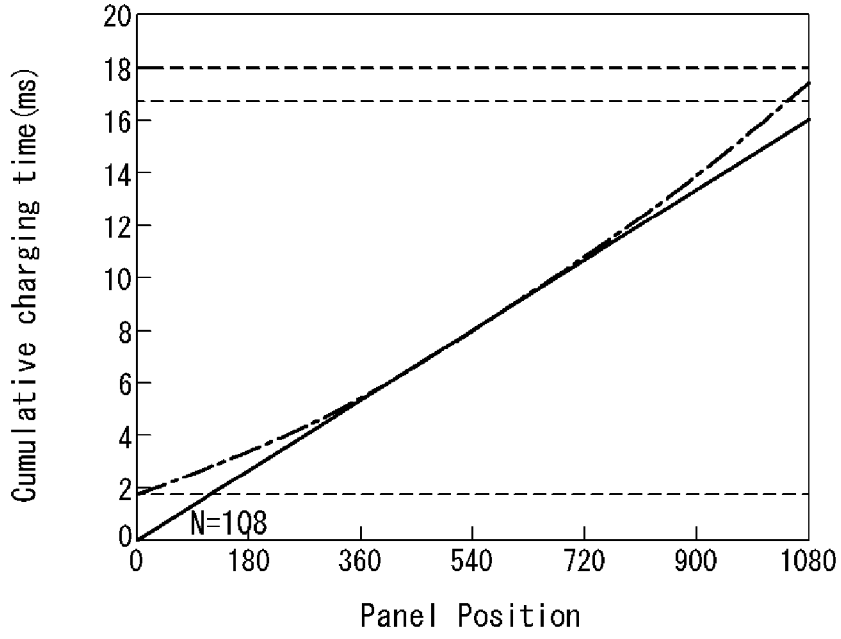
Figure 18A:
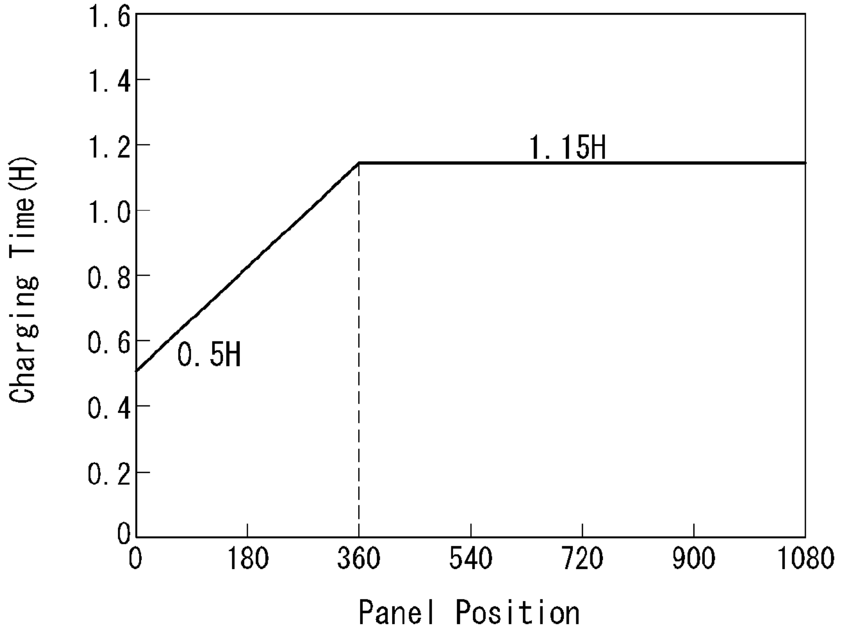
Figure 18B:
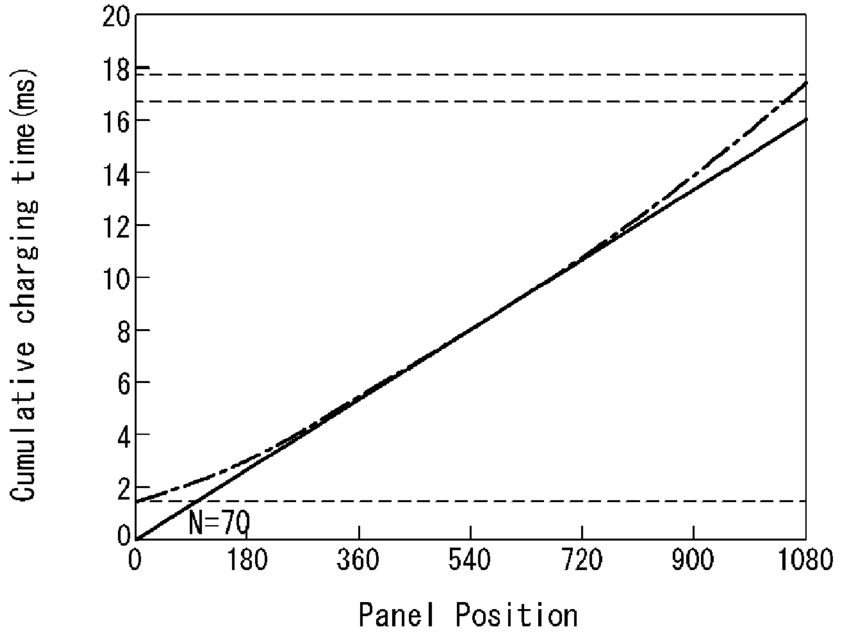

FIGS. 17A, 17B, 18A and 18B illustrate a sixth setting example of the charge time graph. In the sixth setting example, the panel position 'a' is '0 (zero)', and both the panel positions 'c' and 'd' are '1080'. In FIGS. 17A and 17B, the panel position 'b' is '810'. In FIGS. 18A and 18B, the panel position 'b' is '360'. A slope at the panel position 'a-b' in FIG. 17A is different from a slope at the panel position 'a-b' in FIG. 18A.

In FIGS. 17A and 17B, the slope at the panel position 'a-b' corresponds to an increase in the one output clock signal MCLK each time one horizontal period 1H increases. Further, the data charge time on the upper side may be set to 0.56H; the data charge time in the middle may be set to 1H; and the data charge time on the lower side may be set to 1.3H. The 109 line memories are required to achieve the above settings of the data charge time.

In FIGS. 18A and 18B, the slope at the panel position 'a-b' corresponds to an increase in the two output clock signals MCLK each time one horizontal period 1H increases. Further, the data charge time on the upper side may be set to 0.5H; and the data charge time in the middle and on the lower side may be set to 1.15H. The 71 line memories are required to achieve the above settings of the data charge time.

Figure 19A:
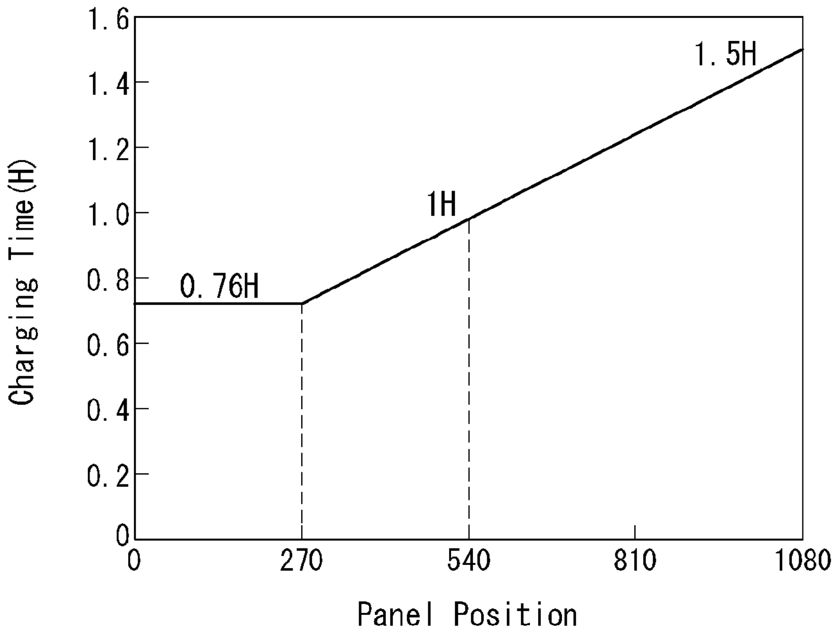
FIGS. 19A, 19B, 20A and 20B illustrate a seventh setting example of a charge time graph.
Figure 19B:
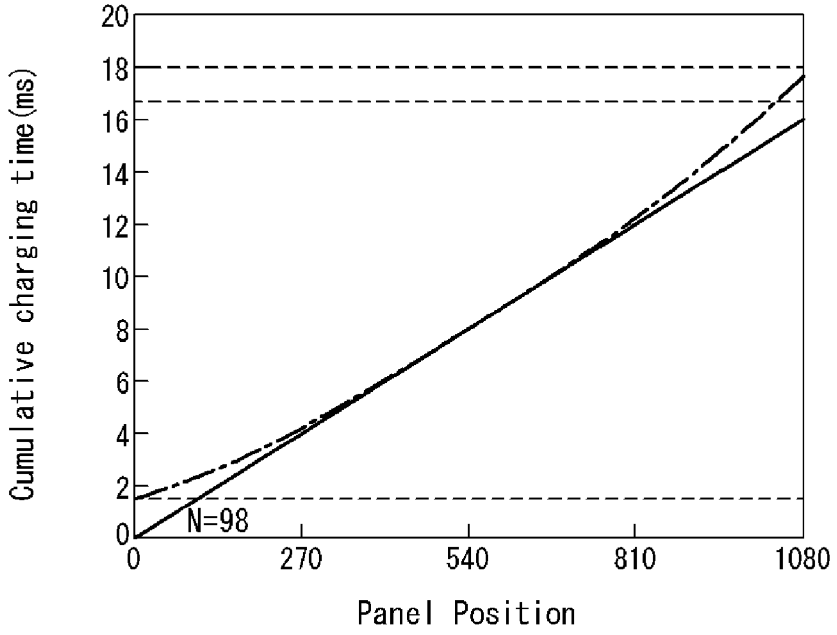
Figure 20A:
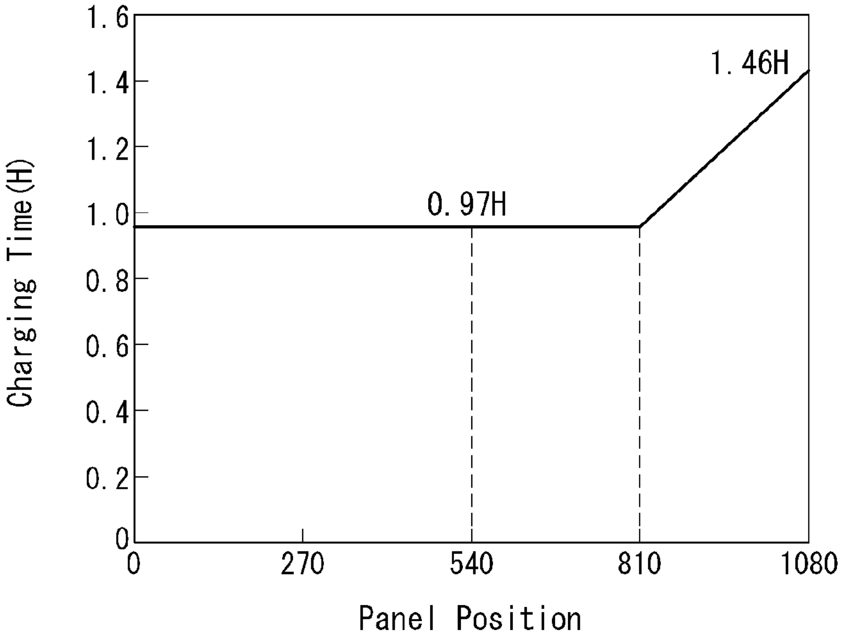
Figure 20B:
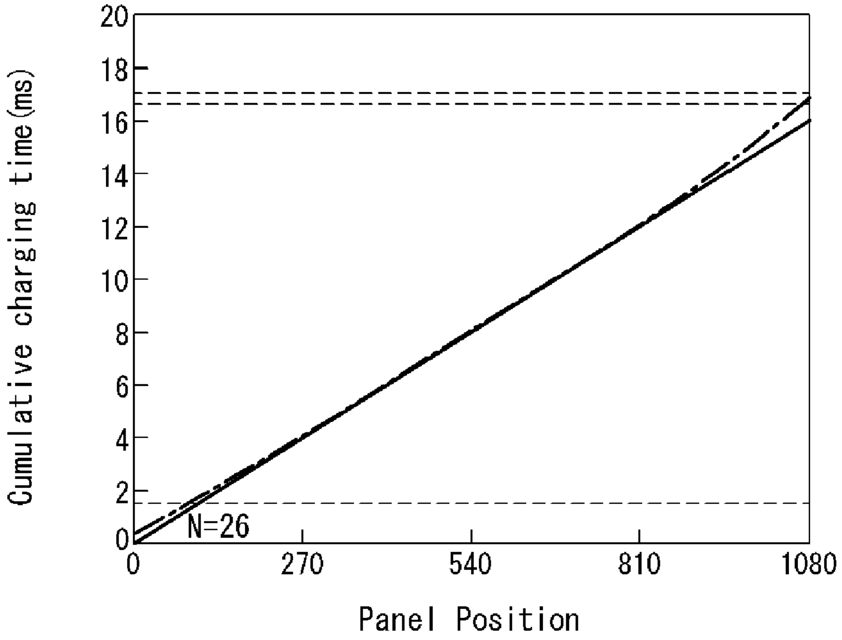

FIGS. 19A, 19B, 20A and 20B illustrate a seventh setting example of the charge time graph. In the seventh setting example, all the panel positions 'b', 'c' and 'd' are '1080'. In FIGS. 19A and 19B, the panel position 'a' is '270'. In FIGS. 20A and 20B, the panel position 'a' is '810'. A slope at the panel position 'a-b' in FIG. 19A is different from a slope at the panel position 'a-b' in FIG. 20A.

In FIGS. 19A and 19B, the slope at the panel position 'a-b' corresponds to an increase in the one output clock signal MCLK each time one horizontal period 1H increases. Further, the data charge time on the upper side may be set to 0.76H; the data charge time in the middle may be set to 1H; and the data charge time on the lower side may be set to 1.5H. The 99 line memories are required to achieve the above settings of the data charge time.

In FIGS. 20A and 20B, the slope at the panel position 'a-b' corresponds to an increase in the two output clock signals MCLK each time one horizontal period 1H increases. Further, the data charge time on the upper side and in the middle may be set to 0.97H; and the data charge time on the lower side may be set to 1.46H. The 27 line memories are required to achieve the above settings of the data charge time.

Figure 21A:
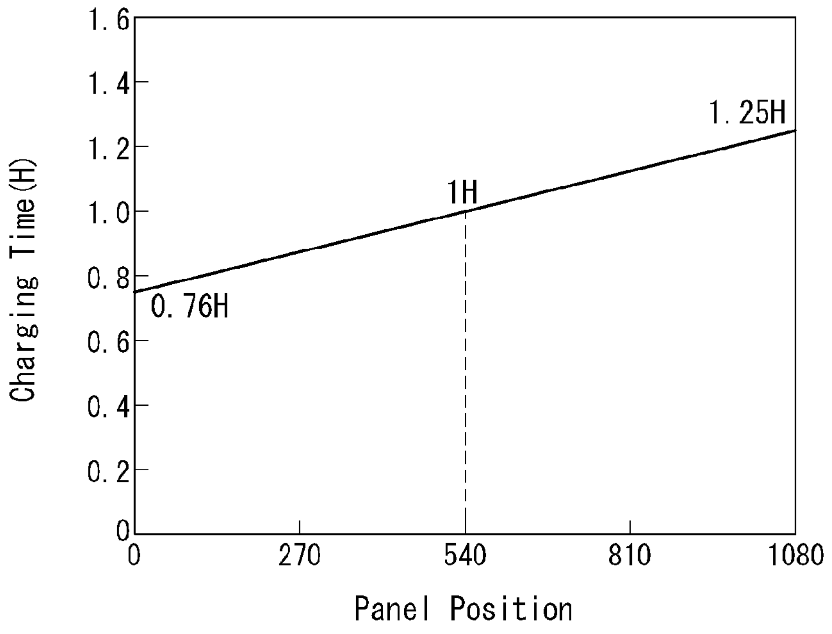
FIGS. 21A, 21B, 22A and 22B illustrate an eighth setting example of a charge time graph.

FIGS. 21A, 21B, 22A and 22B illustrate an eighth setting example of the charge time graph. In the eighth setting example, the panel position 'a' is '0 (zero)', and all the panel positions 'b', 'c' and 'd' are '1080'. A slope at the panel position 'a-b' in FIG. 21A is different from a slope at the panel position 'a-b' in FIG. 22A.

Figure 21B:
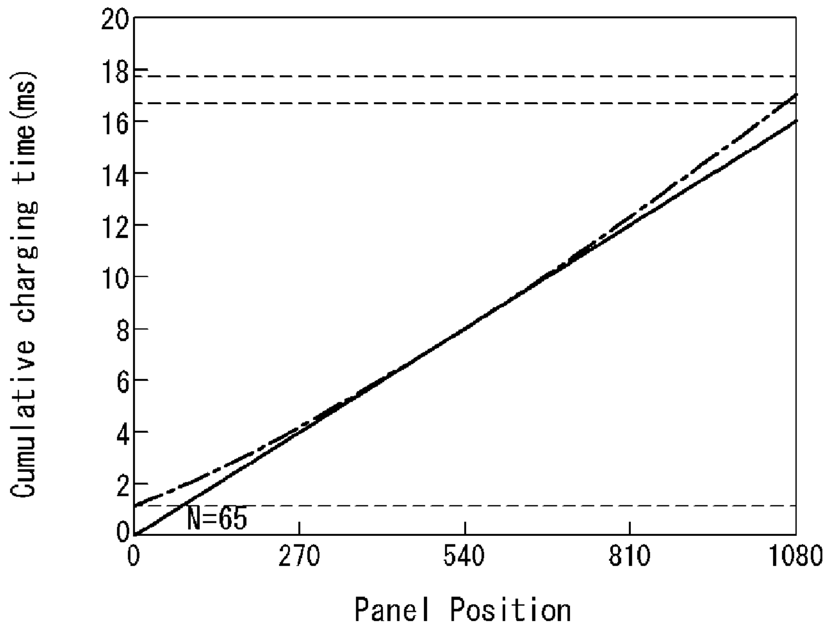

In FIGS. 21A and 21B, the slope at the panel position 'a-b' corresponds to an increase in the one output clock signal MCLK each time two horizontal periods 2H increase. Further, the data charge time on the upper side may be set to 0.76H; the data charge time in the middle may be set to 1H; and the data charge time on the lower side may be set to 1.25H. The 66 line memories are required to achieve the above settings of the data charge time.

Figure 22A:
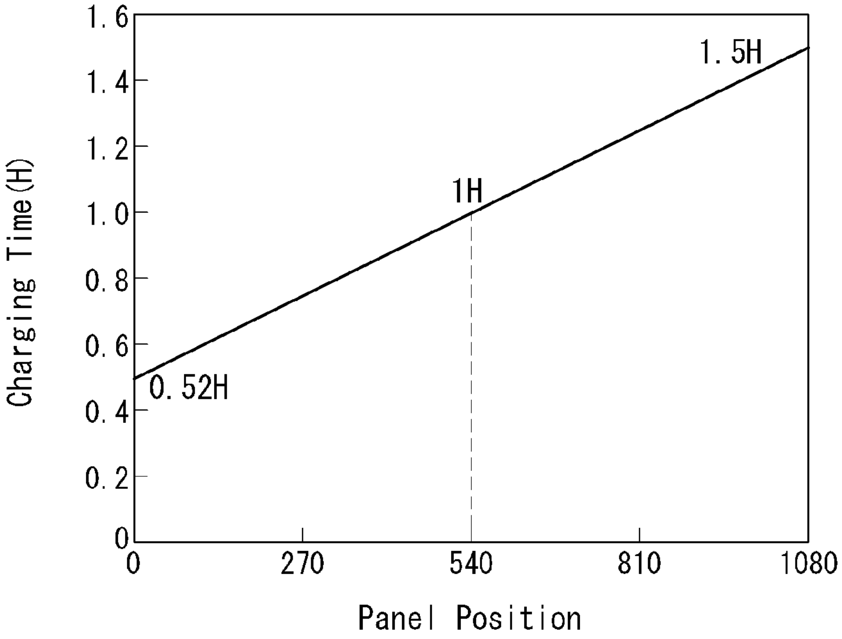
Figure 22B:
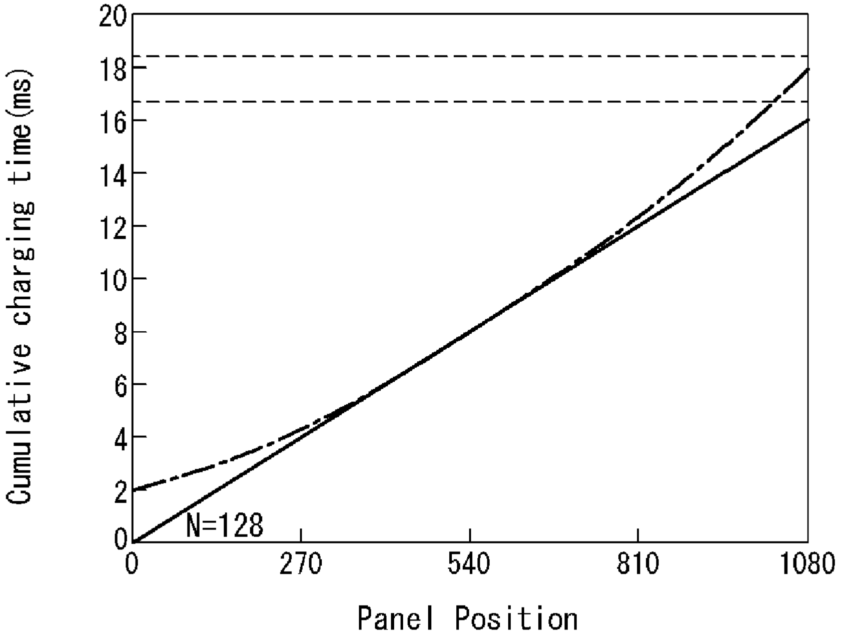

In FIGS. 22A and 22B, the slope at the panel position 'a-b' corresponds to an increase in the one output clock signal MCLK each time one horizontal period 1H increases. Further, the data charge time on the upper side may be set to 0.52H; the data charge time in the middle may be set to 1H; and the data charge time on the lower side may be set to 1.5H. The 129 line memories are required to achieve the above settings of the data charge time.

Figure 23:
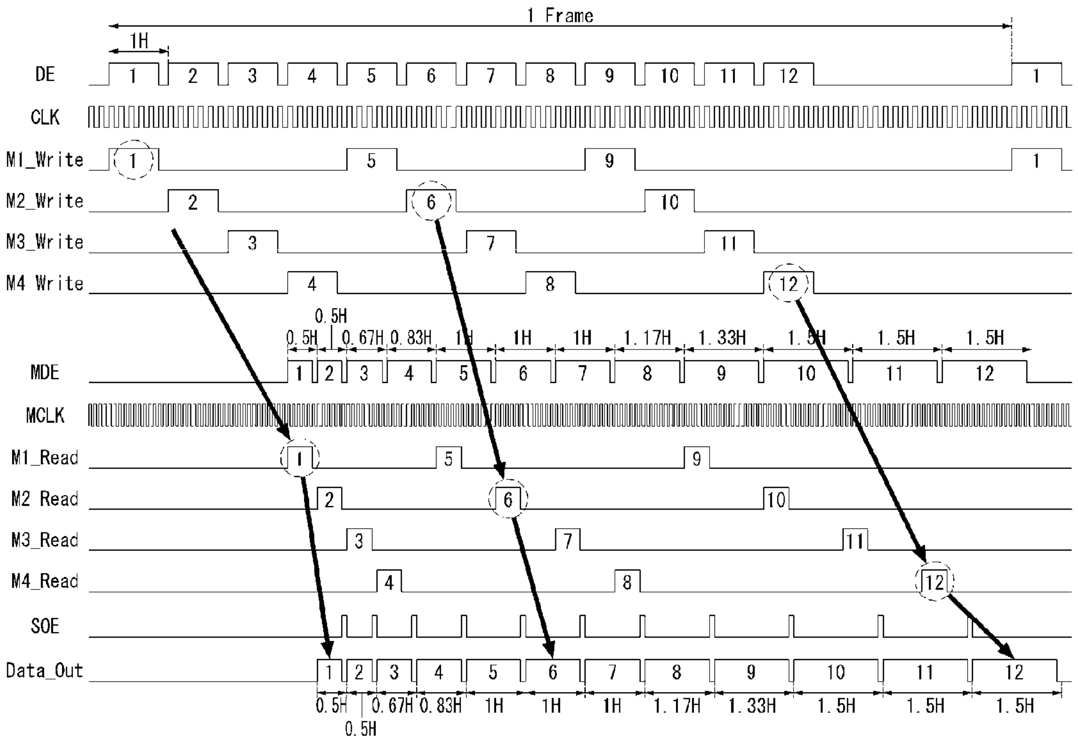
FIGS. 23 and 24 illustrate an example of applying a driving principle of charge time control to a simple model.
Figure 24:
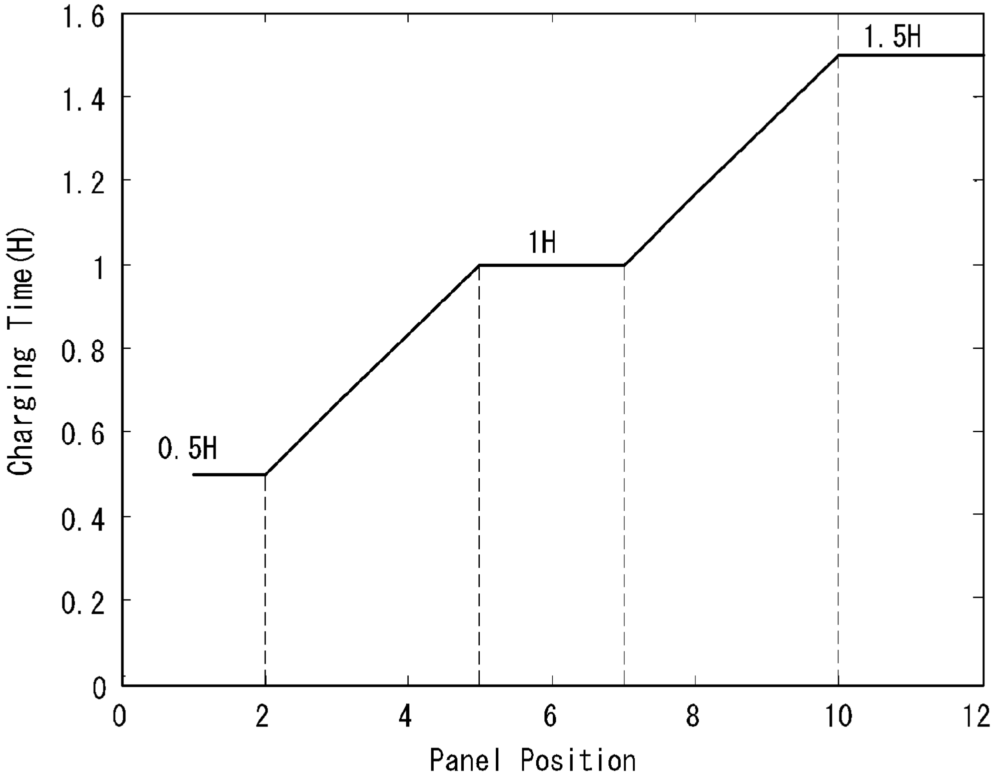

FIGS. 23 and 24 illustrate an example of applying a driving principle of charge time control to a simple model. In FIGS. 23 and 24, a vertical resolution is 12, and four line memories are used for the sake of brevity and ease of reading.

As shown in FIGS. 23 and 24, the embodiment of the invention sequentially stores input digital video data RGB using four line memories M1, M2, M3, and M4. The embodiment of the invention starts to generate the output data enable signal MDE in conformity with a writing start timing of the last line memory M4 of the four line memories M1, M2, M3, and M4. In this instance, the embodiment of the invention adjusts a pulse width of the output data enable signal MDE in conformity with the charge time graph shown in FIG. 24. The pulse width of the output data enable signal MDE is changed based on a doubled output clock signal MCLK. Namely, as shown in FIG. 24, the embodiment of the invention sets the pulse widths of the output data enable signal MDE at panel positions '0-2', '5-7' and '10-12' to 0.5H, 1H and 1.5H, respectively. Further, the embodiment of the invention increases two clocks of the output clock signal MCLK every one horizontal period 1H in response to a predetermined slope at panel positions '2-5' and '7-10'. The embodiment of the invention reads out the digital video data RGB stored in the line memories in synchronization with rising edges of the output data enable signal MDE using the output clock signal MCLK. The embodiment of the invention generates the source output enable signal SOE having the same pulse width each time each line memory finishes reading out the data. Hence, as a horizontal pixel line of the display panel is farther from the source driver, a low period of the source output enable signal SOE increases. The embodiment of the invention allows an output of data in the low period of the source output enable signal SOE and secures the data charge time in proportion to the RC delay.

Figure 25:
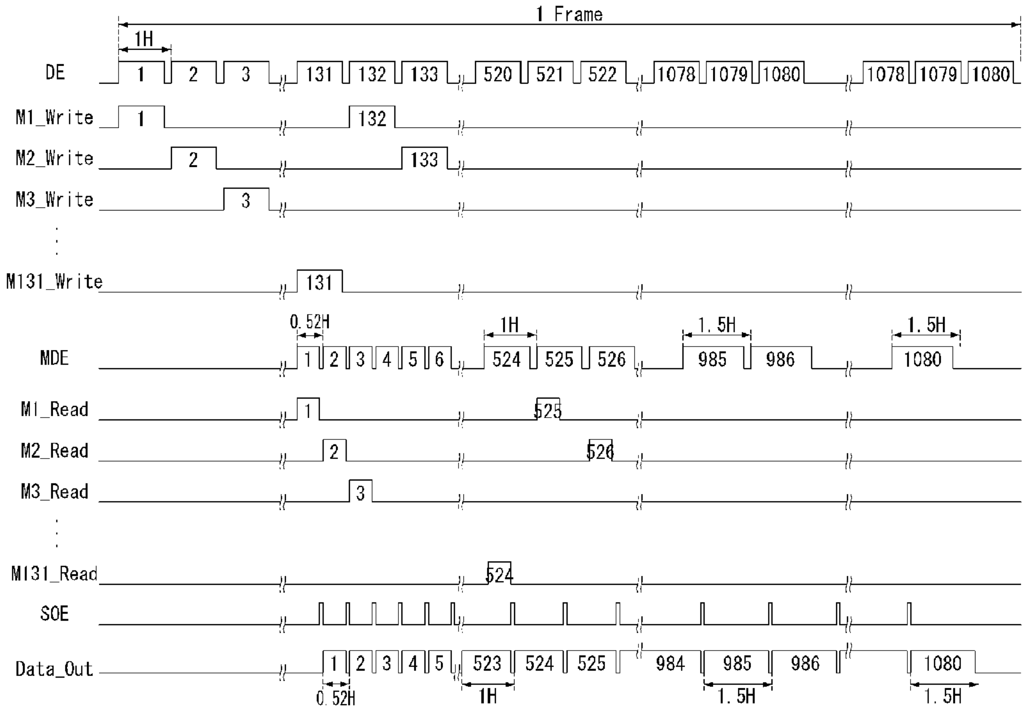
FIG. 25 illustrates an example of applying a driving principle of charge time control to a real FHD model.

FIG. 25 illustrates an example of applying a driving principle of charge time control to a real FHD model. In FIG. 25, a vertical resolution is 1080, and 131 line memories are used.

As shown in FIG. 25, the embodiment of the invention sequentially stores input digital video data RGB using 131 line memories M1 to M131. The embodiment of the invention starts to generate the output data enable signal MDE in conformity with a writing start timing of the last line memory M131 of the 131 line memories M1 to M131. In this instance, the embodiment of the invention adjusts a pulse width of the output data enable signal MDE in conformity with the charge time graph shown in FIGS. 8A and 8B. The pulse width of the output data enable signal MDE is changed based on a doubled output clock signal MCLK. Namely, as shown in FIG. 8A, the embodiment of the invention sets the pulse widths of the output data enable signal MDE at panel positions '0-180', '360-720' and '900-1080' to 0.52H, 1H and 1.5H, respectively. Further, the embodiment of the invention increases three clocks of the output clock signal MCLK every one horizontal period 1H in response to obtain a predetermined slope at panel positions '180-360' and '720-900'. The embodiment of the invention reads out the digital video data RGB stored in the line memories in synchronization with rising edges of the output data enable signal MDE using the output clock signal MCLK. The embodiment of the invention generates the source output enable signal SOE having the same pulse width each time each line memory finishes reading out the data. Hence, as a horizontal pixel line of the display panel is farther from the source driver, a low period of the source output enable signal SOE increases. The embodiment of the invention allows an output of data in the low period of the source output enable signal SOE and secures the data charge time proportion to the RC delay.

As described above, the embodiment of the invention properly selects the charge time graph, which is previously determined based on the characteristics of the display panel, and the necessary number of line memories, thereby adjusting the data charge time in consideration of the RC delay. Hence, the embodiment of the invention reduces the charge deviation between a position close to the source driver and a position farther from the source driver, thereby preventing the luminance deviation.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:

a display panel including a plurality of data lines;

a source driver which is positioned at one side of the display panel and is connected to the data lines; and a timing controller configured to sequentially store input digital video data in a plurality of line memories, start to generate an output data enable signal in conformity with a first writing start timing of a last line memory of the plurality of line memories, adjust a pulse width of the output data enable signal of each horizontal pixel line based on a previously determined charge time graph, read out the digital video data from the line memories in synchronization with rising edges of the output data enable signal, generate a source output enable signal having the same pulse width each time each line memory finishes reading out the data, and increase a low period of the source output enable signal, in which a data output is allowed, as the horizontal pixel line is farther from the source driver.

2. The display device of claim 1, wherein the charge time graph is set depending on a model and characteristics of the display panel.

3. The display device of claim 1, wherein the charge time graph is set, so that a first condition where a time, at which data is stored in the line memories, is earlier than a time, at which data is read out from the line memories, and a second condition where all data for displaying one screen are processed in one frame are satisfied, and wherein the number of line memories is determined by the first and second conditions.

4. The display device of claim 1, wherein the timing controller doubles an input clock signal and generates an output clock signal, wherein the pulse width of the output data enable signal is adjusted based on the output clock signal.

5. The display device comprising of claim 4, wherein the timing controller increases a predetermined number of output clock signals every one horizontal period in response to a predetermined slope period, which is previously determined by the charge time graph, and increases the pulse width of the output data enable signal.

6. A method of compensating for a data charge deviation of a display device including a display panel including a plurality of data lines and a source driver which is positioned at one side of the display panel and is connected to the data lines, the method comprising:

sequentially storing input digital video data in a plurality of line memories;

starting to generate an output data enable signal in conformity with a first writing start timing of a last line memory of the plurality of line memories;

adjusting a pulse width of the output data enable signal of each horizontal pixel line based on a previously determined charge time graph;

reading out the digital video data from the line memories in synchronization with rising edges of the output data enable signal; and generating a source output enable signal having the same pulse width each time each line memory finishes reading out the data to increase a low period of the source output enable signal, in which a data output is allowed, as the horizontal pixel line is farther from the source driver.

7. The method of claim 6, wherein the charge time graph is set depending on a model and characteristics of the display panel.

8. The method of claim 6, wherein the charge time graph is set, so that a first condition where a time, at which data is stored in the line memories, is earlier than a time, at which data is read out from the line memories, and a second condition where all data for displaying one screen are processed in one frame are satisfied, wherein the number of line memories is determined by the first and second conditions.

9. The method of claim 6, further comprising doubling an input clock signal to generate an output clock signal, wherein the pulse width of the output data enable signal is adjusted based on the output clock signal.

10. The method of claim 9, wherein the adjusting of the pulse width of the output data enable signal includes increasing a predetermined number of output clock signals every one horizontal period in response to a predetermined slope period, which is previously determined by the charge time graph, to increase the pulse width of the output data enable signal.

* * * * *